United States Patent
Lo et al.

(10) Patent No.: US 12,076,650 B2
(45) Date of Patent: *Sep. 3, 2024

(54) SYSTEMS AND METHODS FOR ALGORITHMICALLY ARRANGING CONTESTS IN A LOBBY INTERFACE

(71) Applicant: DK Crown Holdings Inc., Boston, MA (US)

(72) Inventors: Frank Lo, Boston, MA (US); Brandon Joseph Ward, Somerville, MA (US); Brendan Thompson Grove, Brookline, MA (US); Jordan Mendell, Boca Raton, FL (US); Travis Dunn, Nashua, NH (US)

(73) Assignee: DK Crown Holdings Inc., Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,915

(22) Filed: Jan. 9, 2023

(65) Prior Publication Data

US 2023/0158410 A1    May 25, 2023

Related U.S. Application Data

(63) Continuation of application No. 17/114,100, filed on Dec. 7, 2020, now Pat. No. 11,547,944, which is a
(Continued)

(51) Int. Cl.
*A63F 13/828* (2014.01)
*A63F 13/46* (2014.01)
*A63F 13/79* (2014.01)

(52) U.S. Cl.
CPC .......... *A63F 13/828* (2014.09); *A63F 13/46* (2014.09); *A63F 13/79* (2014.09)

(58) Field of Classification Search
CPC ........ A63F 13/46; A63F 13/79; A63F 13/828; A63F 13/48; A63F 13/77; A63F 13/352; A63F 2300/531; A63F 2300/57
(Continued)

(56) References Cited

U.S. PATENT DOCUMENTS

2006/0287106 A1    12/2006    Jensen
2007/0202953 A1    8/2007    Taninami
(Continued)

OTHER PUBLICATIONS

Non-Final Office Action on U.S. Appl. No. 17/114,100 dated Jun. 10, 2022.
(Continued)

*Primary Examiner* — Michael A Cuff
(74) *Attorney, Agent, or Firm* — Foley & Lardner LLP

(57) ABSTRACT

Systems and methods for algorithmically arranging contests in a lobby interface are provided. A contest management system can generate, execute and maintain a plurality of contests, such as but not limited to, fantasy sports contests. Rank values can be assigned to the contests using pacing parameters of the contests and profile attributes of users who participate in the contests. The pacing parameters, such as registration ratios and registration deadlines, can indicate if a particular contest is on pace to meet a registration threshold prior to their respective registration deadline. The contest management system can dynamically update, responsive to receiving a plurality of registrations from a plurality of users, the rank value of one or more contests responsive to a change in a registration ratio of at least one contest and arrange the plurality of contests in a lobby interface based on the updated rank values.

20 Claims, 19 Drawing Sheets

Related U.S. Application Data continuation of application No. 16/440,544, filed on Jun. 13, 2019, now Pat. No. 10,857,470.

(60) Provisional application No. 62/684,492, filed on Jun. 13, 2018.

(58) Field of Classification Search
USPC .......................................................... 463/42
See application file for complete search history.

(56) References Cited

U.S. PATENT DOCUMENTS

| | | |
|---|---|---|
| 2007/0233291 A1 | 10/2007 | Herde et al. |
| 2009/0191971 A1 | 7/2009 | Avent |
| 2012/0028719 A1 | 2/2012 | Inubushi et al. |
| 2015/0087375 A1 | 3/2015 | Reeves et al. |
| 2016/0354690 A1* | 12/2016 | Gault ...................... H04L 65/80 |
| 2018/0071634 A1* | 3/2018 | Carvallo ................. A63F 13/92 |
| 2018/0071637 A1 | 3/2018 | Baazov et al. |
| 2018/0211491 A1 | 7/2018 | Burnside et al. |
| 2019/0217205 A1 | 7/2019 | Atli et al. |
| 2019/0378374 A1 | 12/2019 | Sawyer et al. |
| 2019/0384469 A1 | 12/2019 | Lo et al. |

OTHER PUBLICATIONS

Notice of Allowance on U.S. Appl. No. 16/440,544 dated Aug. 6, 2020.

Notice of Allowance on U.S. Appl. No. 17/114,100 dated Sep. 15, 2022.

* cited by examiner

Lobby 202

| Sport | Contest | Style | Entry Fee | Total Prizes | Registrants | Live |
|---|---|---|---|---|---|---|
| Football | C1 | Classic | $5 | G$500,000 | 235K/118.9K | 00:22 |
| Football | C2 | Classic | $22 | G$200,000 | 22/7067 | 00:22 |
| Basketball | C3 | Pick'Em | $22 | G$250,000 | 143/14.7K | 01:01 |
| Football | C4 | Classic | $25 | G$7,000 | 6/302 | 00:45 |
| Football | C5 | Classic | $33 | G$125,000 | 24/5322 | 01:01 |
| Basketball | C6 | Classic | $8 | G$200,000 | 52/16.6K | 01:21 |
| Football | C7 | Pick'Em | $25 | G$8,000 | 3/295 | 00:45 |

Computer Resource Allocation 204

Lobby 202

| Sport | Contest | Style | Entry Fee | Total Prizes | Registrants | Live |
|---|---|---|---|---|---|---|
| Football | C1 | Classic | $5 | G$500,000 | 965K/118.9K | 00:22 |
| Football | C2 | Classic | $22 | G$200,000 | 5024/7067 | 00:22 |
| Basketball | C3 | Pick'Em | $22 | G$250,000 | 11.2K/14.7K | 01:01 |
| Football | C4 | Classic | $25 | G$7,000 | 255/302 | 00:45 |

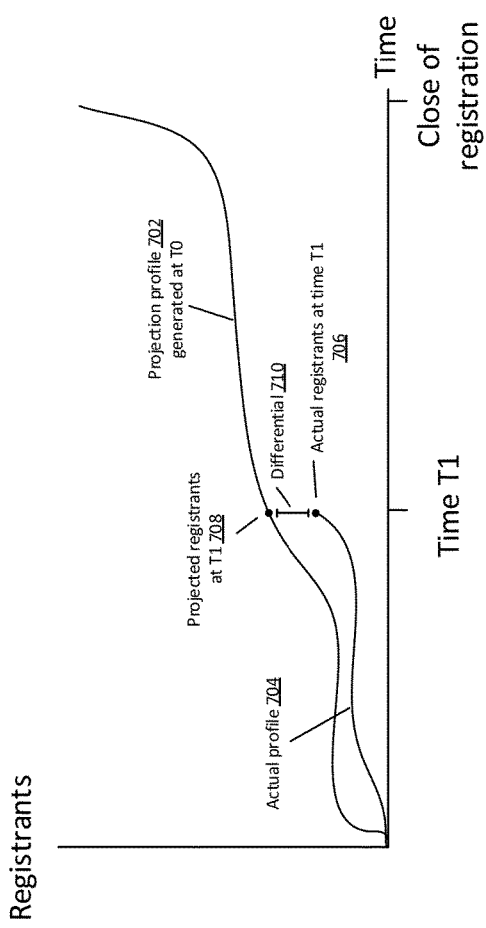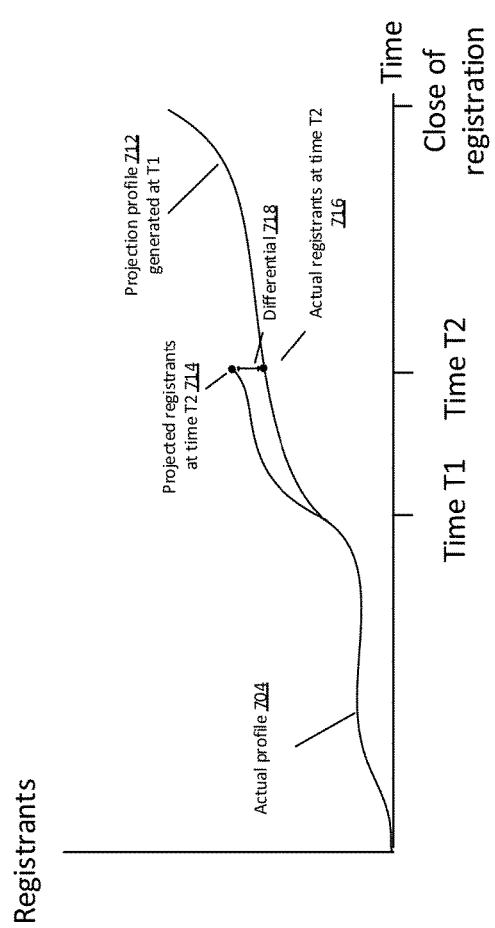
FIG. 7A
FIG. 7B

Contest Management System 900

Contest Database 940

| Contest | 925a Contest Sport | 925b Contest Type | 925c Contest Entry Fee | 925d Contest Total Prizes | 925e Contest Registrants | 925f Contest Registration Deadline | 925g Contest Pacing Score | 925h Contest Rank Value |
|---|---|---|---|---|---|---|---|---|
| Contest 1 920a | Football | Classic | $30 | $500,000 | 305K/400K | 0:22 | 0.76 | 4 |
| Contest 2 920b | Football | Classic | $20 | $350,000 | 555K/600K | 0:25 | 0.93 | 5 |
| Contest 3 920c | Baseball | Pick'em | $10 | $200,000 | 125K/250K | 1:05 | 0.50 | 2 |
| Contest 4 920d | Basketball | Classic | $15 | $300,000 | 335K/500K | 0:45 | 0.67 | 3 |
| ... | ... | ... | ... | ... | ... | ... | ... | ... |
| Contest N 920n | Baseball | Pick'em | $25 | $250,000 | 206K/500K | 1:35 | 0.41 | 1 |

FIG. 10

SYSTEMS AND METHODS FOR ALGORITHMICALLY ARRANGING CONTESTS IN A LOBBY INTERFACE

CROSS-REFERENCE TO RELATED APPLICATIONS

The present application is a continuation of, and claims the benefit of and priority to U.S. patent application Ser. No. 17/114,100, titled "SYSTEMS AND METHODS FOR ALGORITHMICALLY ARRANGING CONTESTS IN A LOBBY INTERFACE", filed on Dec. 7, 2020, which itself is a continuation of, and claims the benefit of and priority to U.S. patent application Ser. No. 16/440,544, titled "SYSTEMS AND METHODS FOR ALGORITHMICALLY ARRANGING CONTESTS IN A LOBBY INTERFACE", filed on Jun. 13, 2019, now U.S. Pat. No. 10,857,470, which claims the benefit of and priority to U.S. Provisional Application 62/684,492, filed on Jun. 13, 2018. The contents of each of which are incorporated herein by reference in their entirety for all purposes.

BACKGROUND OF THE DISCLOSURE

Content management systems allocate and use a lot of computing resources to transmit content to a very large number of remote computing devices. Similarly, remote computing devices also allocate and use a lot of computing resources to receive and display the content received from the content management systems. In the case of mobile devices where memory, processing power and power are all finite resources, the receipt and display of content that is not contextually relevant to a user can adversely affect the device's performance and life as well the overall user experience. As such, content management systems should utilize appropriate resource management policies to reduce the amount of contextually irrelevant content being delivered to the remote computing devices.

BRIEF SUMMARY OF THE DISCLOSURE

The present disclosure relates to one or more systems and methods for algorithmically arranging contests in a lobby interface. A contest management system can generate, execute and maintain a plurality of contests, such as but not limited to, fantasy sports contests. The contest management system can assign rank values to the contests based in part on contest pacing parameters of the respective contests and profile attributes of a plurality of users who participate in the contests. Each of the contests can include contest pacing parameters, such as registration ratios and registration deadlines, that indicate if a particular contest is on pace to meet a registration threshold prior to their respective registration deadline. For example, if a contest is under-saturated (e.g., does not have enough registrants by the registration deadline), the contest may be canceled or rescheduled or in some embodiments, promoted or prioritized in an effort to increase the number of registrants.

Thus, the contest management system as described here can use contest pacing algorithms to identify contests that may be at risk of not meeting their respective registration threshold and also identify one or more users that have participated in similar contests in the past to the contests at risk of not meeting their respective registration threshold and are more likely to participate in the identified contests. The contest management system can identify user vectors linking the user profiles of these respective users and provide the contests to devices associated with the users, for example, as recommendations, to aid the respective contests in meeting their registration thresholds.

In a first aspect, a method for algorithmically arranging contests in a lobby interface is provided. The method can include identifying, by one or more processors, a plurality of contests to be provided in a lobby interface to a plurality of users. The plurality of contests can have a plurality of contest attributes. The method can include determining, by the one or more processors, a registration ratio for each of the plurality of contests and a registration deadline for each of the plurality of contests. The method can include determining, by the one or more processors using a contest pacing algorithm, a contest pacing score for each of the plurality of contests. The contest pacing score of each contest can be determined using the respective registration ratio and the respective registration deadline of the contest. The method can include determining, by the one or more processors, using a grouping algorithm, a plurality of groups of contests based on the contest attributes of the contests. The method can include computing, by the one or more processors using a ranking algorithm, for each contest in a first group of the plurality of groups, a rank value for the contest based on the contest pacing score of the contest, a first contest attribute of the contest, and a second contest attribute of the contest. The first contest attribute can have a first weight greater than a second weight of the second contest attribute. The ranking algorithm can use the first weight and the second weight to compute the rank value. The method can include updating the rank value of at least the first contest responsive to a change in a registration ratio of the first contest of the plurality of contests. The method can include arranging, by the one or more processors, the plurality of contests for display within a lobby interface based on the updated rank value of the at least first contest.

In embodiments, the method can include determining, by the one or more processors using the contest pacing algorithm, one or more contests of the plurality of contests have registration ratios that are less than a registration threshold and the registration deadline of the one or more contests is within a predetermined time period. The method can include selecting, by the one or more processors using the contest pacing algorithm, one or more contests of the plurality of contests and ranking, by the one or more processors using the ranking algorithm, the one or more contests based on a difference between their respective registration ratio and their respective registration threshold. The method can include generating, by the one or more processors, recommendations for the plurality of users based on the plurality of contests using the rank value and the difference between their respective registration ratio and their respective registration threshold. The method can include updating the rank value of at least the first contest based on a time difference between a current time and the registration deadline.

In embodiments, the first contest attribute or the second contest attribute can include one or more of the following: a sport category, a price parameter, a prize parameter, a registrant threshold, a registrant limit, a current registrant count, a day value, a time value, a duration value, a contest type, and an experience level. The method can include transmitting, by the one or more processors, to a client device of the plurality of client devices, instructions to display the lobby interface on the client device. The method can include updating the rank value of at least the first contest responsive to receiving at least one registration for a first contest of the first group of contests from at least one of the plurality of users. The method can include updating the rank value of at least the first contest responsive to satisfying an update condition specified by a rank update policy.

In embodiments, the method can include monitoring, by the one or more processors, for changes in the registration ratios of one or more contests of the plurality of contests and updating the rank value of at least one contest of the plurality of contests responsive to detecting a change in the registrations of the plurality of contests. The method can include generating the plurality of contests based on profile attributes associated with the plurality of users. In embodiments, the profile attributes include one or more of the following: a history of past contests, a plurality of lineups, a user type, a location, an activity profile and price parameters.

In at least one aspect, a system for generating a multidimensional data structure using fantasy sports account activity is provided. The system can include one or more processors and memory. The memory can include computer-readable instructions stored in memory that, when executed by the one or more processors, cause the one or more processors to identify a plurality of contests to be provided in a lobby interface to a plurality of users. The plurality of contests can have a plurality of contest attributes. The computer-readable instructions, when executed by the one or more processors, can cause the one or more processors to determine a registration ratio for each of the plurality of contests and a registration deadline for each of the plurality of contests. The computer-readable instructions, when executed by the one or more processors, can cause the one or more processors to determine, using a contest pacing algorithm, a contest pacing score for each of the plurality of contests. The contest pacing score of each contest can be determined using the respective registration ratio and the respective registration deadline of the contest. The computer-readable instructions, when executed by the one or more processors, can cause the one or more processors to determine, using a grouping algorithm, a plurality of groups of contests based on the contest attributes of the contests. The computer-readable instructions, when executed by the one or more processors, can cause the one or more processors to compute, using a ranking algorithm, for each contest in a first group of the plurality of groups, a rank value for the contest based on the contest pacing score of the contest, a first contest attribute of the contest, and a second contest attribute of the contest. The first contest attribute can have a first weight greater than a second weight of the second contest attribute. The ranking algorithm can use the first weight and the second weight to compute the rank value. The computer-readable instructions, when executed by the one or more processors, can cause the one or more processors to update the rank value of at least the first contest responsive to a change in a registration ratio of the first contest of the plurality of contests. The computer-readable instructions, when executed by the one or more processors, can cause the one or more processors to arrange the plurality of contests for display within a lobby interface based on the updated rank value of the at least first contest.

In embodiments, the computer-readable instructions, when executed by the one or more processors, can cause the one or more processors to determine, using the contest pacing algorithm, one or more contests of the plurality of contests have registration ratios that are less than a registration threshold and the registration deadline of the one or more contests is within a predetermined time period. The computer-readable instructions, when executed by the one or more processors, can cause the one or more processors to select, using the contest pacing algorithm, one or more contests of the plurality of contests, and rank, using the ranking algorithm, the one or more contests based on a difference between their respective registration ratio and their respective registration threshold. The computer-readable instructions, when executed by the one or more processors, can cause the one or more processors to generate recommendations for the plurality of users based on the plurality of contests using the rank value and the difference between their respective registration ratio and their respective registration threshold.

In embodiments, the computer-readable instructions, when executed by the one or more processors, can cause the one or more processors to update the rank value of at least the first contest based on a time difference between a current time and the registration deadline. The computer-readable instructions, when executed by the one or more processors, can cause the one or more processors to transmit, to a client device of the plurality of client devices, instructions to display the lobby interface on the client device. The computer-readable instructions, when executed by the one or more processors, can cause the one or more processors to update the rank value of at least the first contest responsive to receiving at least one registration for a first contest of the first group of contests from at least one of the plurality of users. The computer-readable instructions, when executed by the one or more processors, can cause the one or more processors to monitor for changes in the registration ratios of one or more contests of the plurality of contests and update the rank value of at least one contest of the plurality of contests responsive to detecting a change in the registrations of the plurality of contests.

BRIEF DESCRIPTION OF THE DRAWINGS

The foregoing and other objects, aspects, features, and advantages of the disclosure will become more apparent and better understood by referring to the following description taken in conjunction with the accompanying drawings, in which:

FIG. 7A and FIG. 7B show one or more embodiments of a projected registrant profile and an actual registrant profile at a time T1 and a time T2, respectively;

FIG. 10 depicts one or more embodiments of a contest database for organizing a plurality of contests and a plurality of contest attributes;

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for monitoring a pace of registrations of contests for improved allocation of computer resources and for ranking contests.

Section C describes embodiments of systems and methods for algorithmically arranging contests in a lobby interface.

A. Computing and Network Environment

Figure 1A:
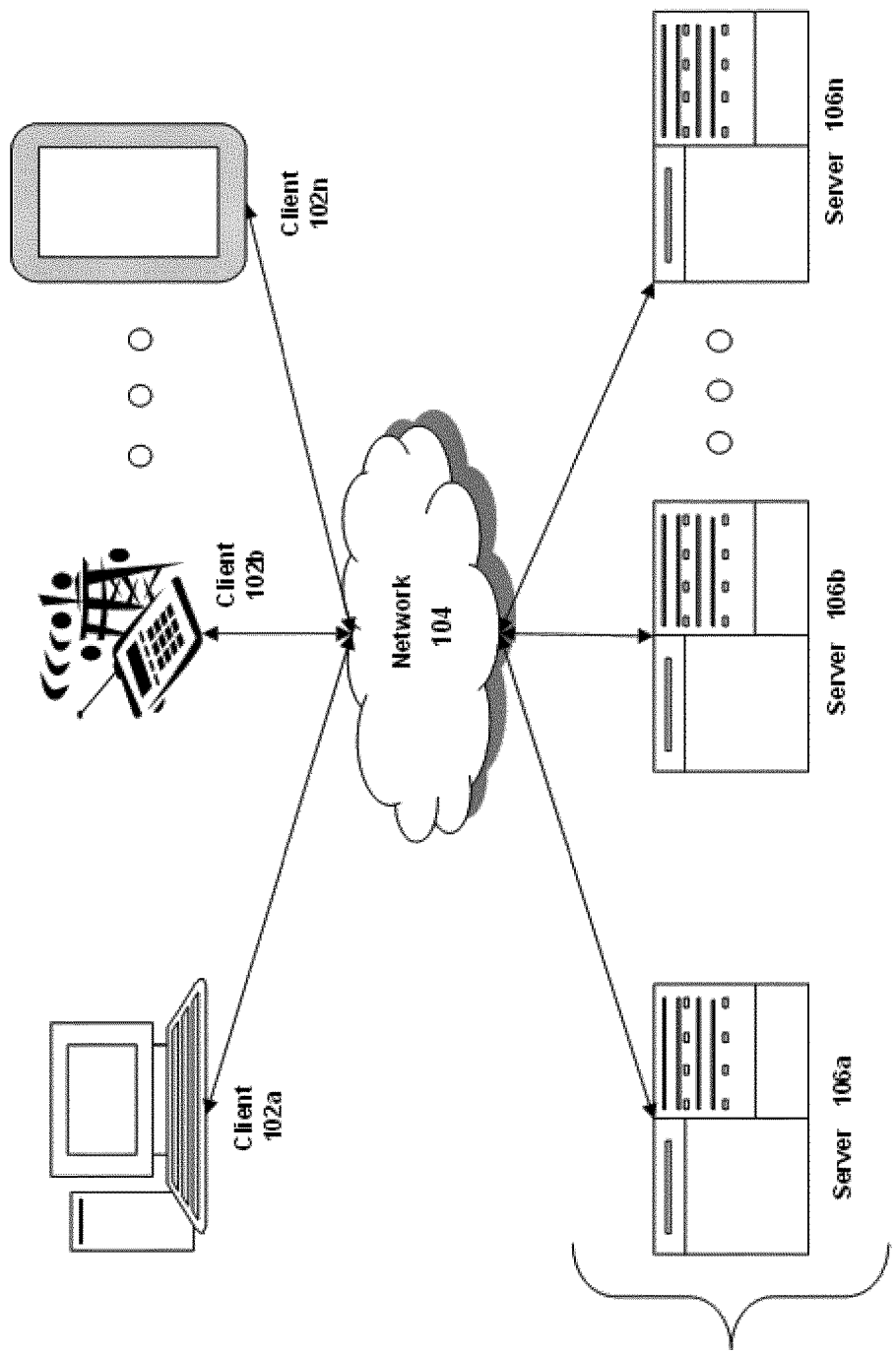
FIG. 1A is a block diagram depicting an embodiment of a network environment comprising client devices in communication with server devices via a network.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2050 (IMT-2050) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Washington), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, California; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
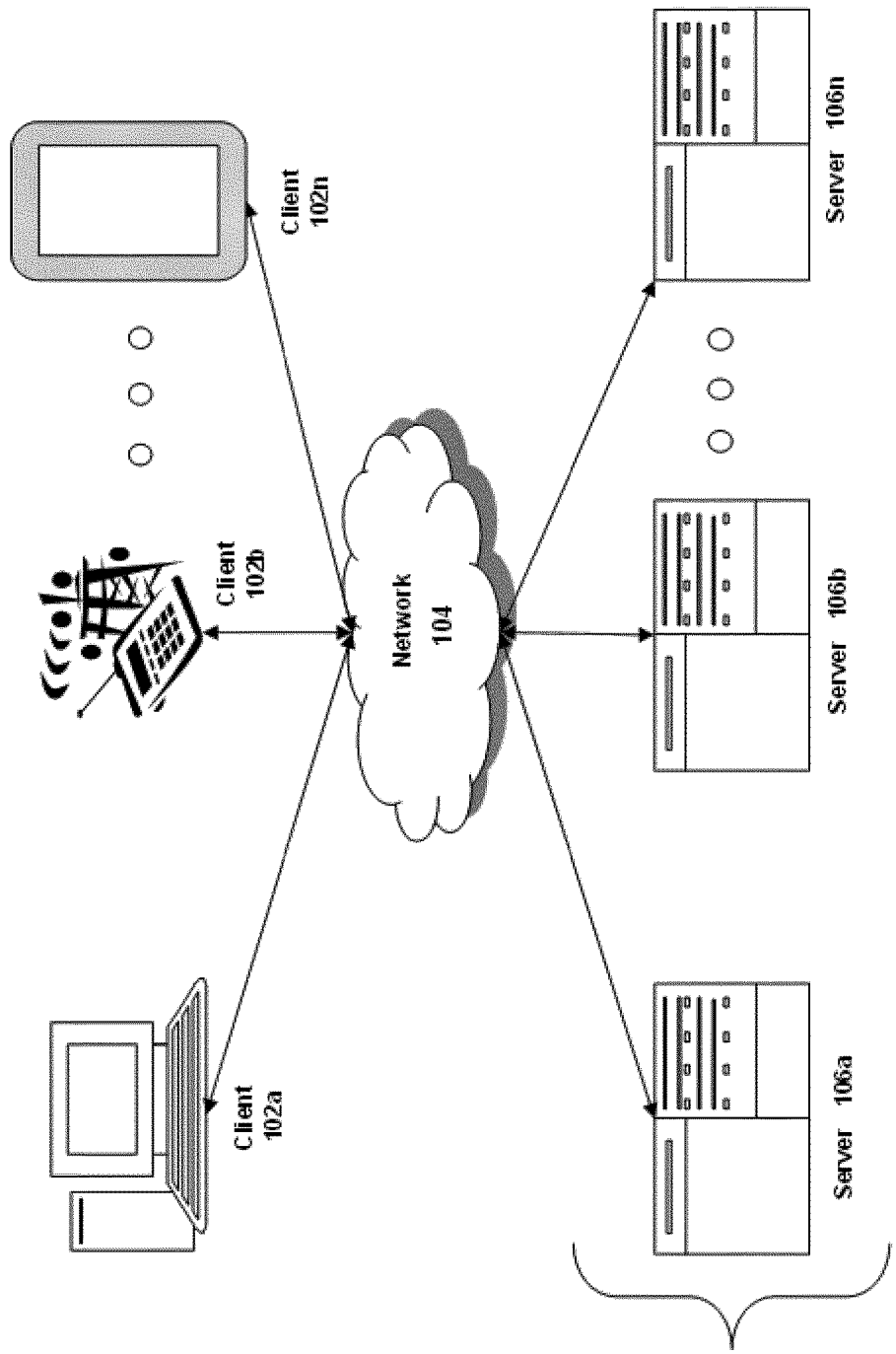
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Washington, RACKSPACE CLOUD provided by Rackspace US, Inc., of San Antonio, Texas, Google Compute Engine provided by Google Inc. of Mountain View, California, or RIGHTSCALE provided by RightScale, Inc., of Santa Barbara, California PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Washington, Google App Engine provided by Google Inc., and HEROKU provided by Heroku, Inc. of San Francisco, California SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, California, or OFFICE 365 provided by Microsoft Corporation. Examples of SaaS may also include data storage providers, e.g. DROPBOX provided by Dropbox, Inc. of San Francisco, California, Microsoft SKYDRIVE provided by Microsoft Corporation, Google Drive provided by Google Inc., or Apple ICLOUD provided by Apple Inc. of Cupertino, California.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, California). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROP-BOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
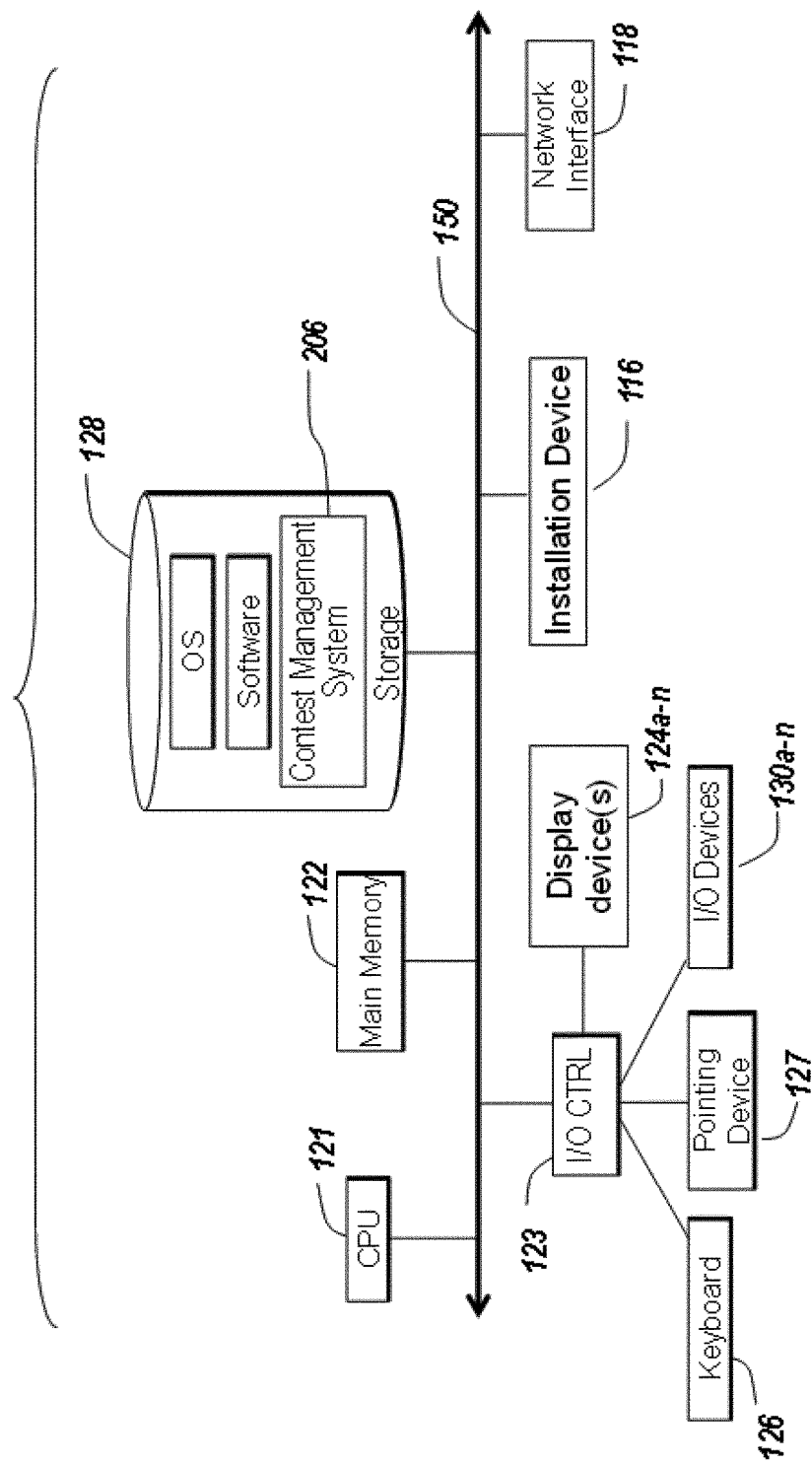
FIGS. 1C and 1D are block diagrams depicting embodiments of computing devices useful in connection with the methods and systems described herein.
Figure 1D:
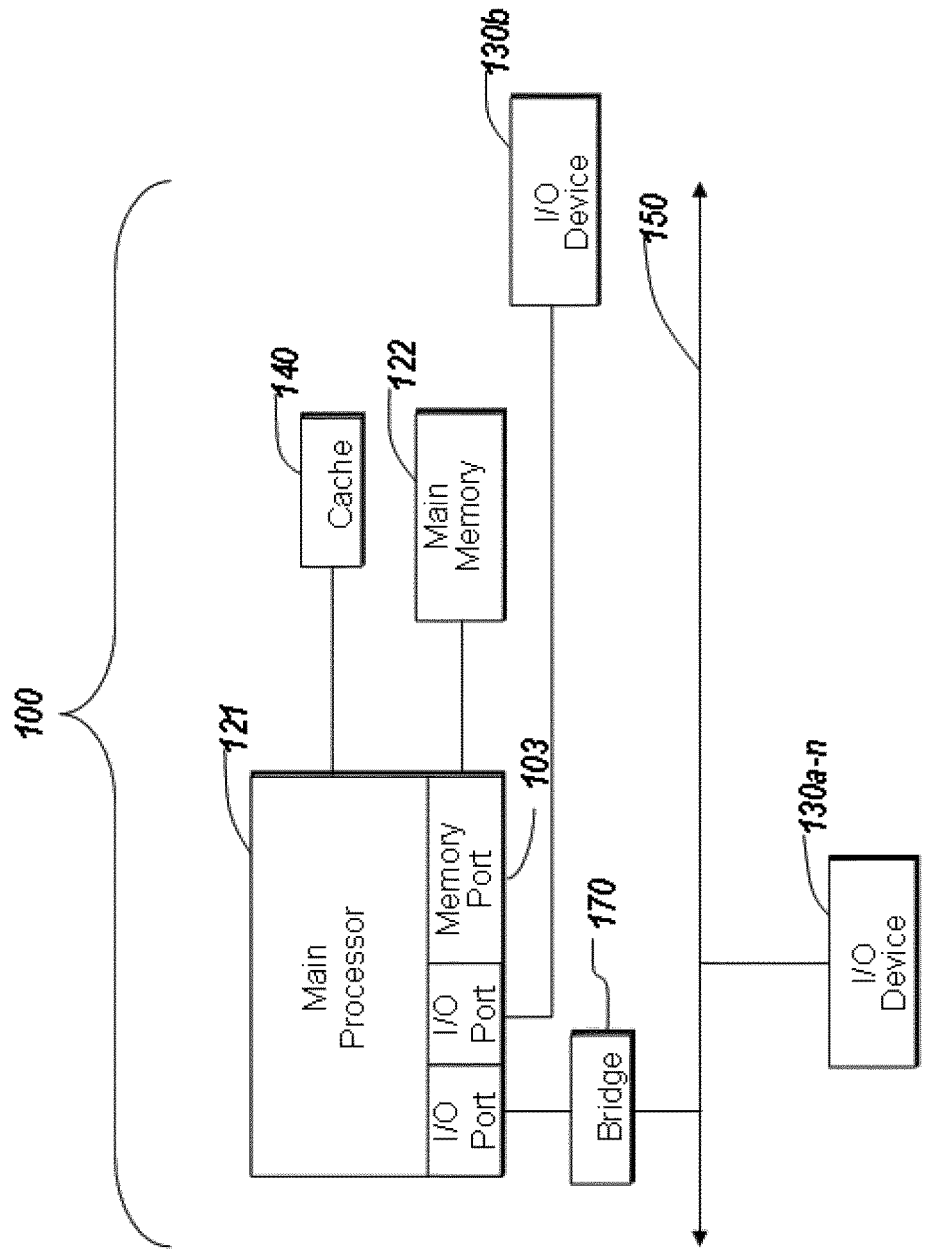

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a contest management system 206. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, California; those manufactured by Motorola Corporation of Schaumburg, Illinois; the ARM processor and TEGRA system on a chip (SoC) manufactured by Nvidia of Santa Clara, California; the POWER7 processor, those manufactured by International Business Machines of White Plains, New York; or those manufactured by Advanced Micro Devices of Sunnyvale, California. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augmented reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software for the contest management system 206. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage devices 128 may be external and connect to the computing device 100 via an I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Florida. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2050, WINDOWS Server 2022, WINDOWS CE, WINDOWS Phone, WINDOWS XP, WINDOWS VISTA, and WINDOWS 7, WINDOWS RT, WINDOWS 8, and WINDOWS 10, all of which are manufactured by Microsoft Corporation of Redmond, Washington; MAC OS and iOS, manufactured by Apple, Inc. of Cupertino, California; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, California, among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a tablet e.g. the IPAD line of devices by Apple; GALAXY TAB family of devices by Samsung; or KINDLE FIRE, by Amazon.com, Inc. of Seattle, Washington In other embodiments, the computing device 100 is an eBook reader, e.g. the KINDLE family of devices by Amazon.com, or NOOK family of devices by Barnes & Noble, Inc. of New York City, New York.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Systems and Methods for Monitoring a Pace of Registrations of Contests for Improved Allocation of Computer Resources As discussed above, systems and methods of the present solution are directed to generating contests to improve computer resource allocation. A contest generating system can avoid or can delay generating new contests and thus avoid registrant dispersion issues, and can help to ensure that fewer contests with more registrants are generated, thus conserving and better allocating computer resources.

According to one aspect, a method for generating contests includes maintaining, by a contest management system including one or more processors, for each first contest of a plurality of first contests managed by the contest management system, historical registration data. The historical registration data identifies, for each time of a plurality of times during which registration of the first contest was open, a number of registrants at the time. Each first contest has respective parameter values of one or more parameters used to generate the first contest. The method further includes identifying, by the contest management system, for a second contest that has an open registration status, respective parameter values of one or more parameters used to generate the second contest, and registration data identifying, for each time of a plurality of times that has lapsed since registration for the second contest was opened, a current number of registrants at the time. The method further includes computing, by the contest management system, a similarity score between the second contest and each first contest of the plurality of first contests. The similarity score can be computed using i) the respective parameter values used to generate the second contest and generate the first contest and ii) the registration data of the second contest and the historical registration data of the first contest. The method further includes selecting, by the contest management system, for the second contest, a subset of the plurality of first contests based on the similarity score exceeding a threshold similarity score value. The method further includes generating, by the contest management system, for the second contest, a projected number of registrants based on i) a current number of registrants of the second contest and ii) the historical registration data of one or more first contests included in the selected subset. The method further includes determining, by the contest management system, a time at which to generate a fourth contest based on the projected number of registrants, and generating, by the contest management system, the fourth contest at the determined time.

Figure 2A:
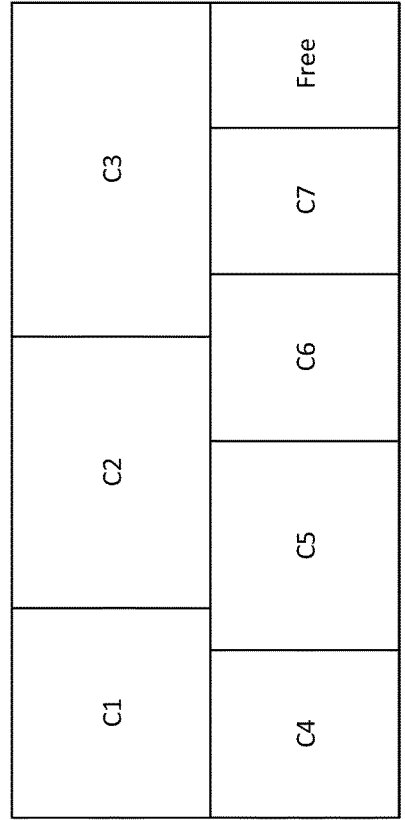
FIG. 2A depicts a contest lobby showing contests and a corresponding allocation of computer resources.

Referring now to FIG. 2A, a representation of a lobby 202 including contests C1 through C7 is shown. Data or computer resources to allow a client device to render or otherwise present the lobby 202 may be transmitted to the client device by the contest management system 206. The lobby 202 shows seven contests that are open for registration on a first page or first screen, but more contests (including one or more that are open for registration) can be maintained by the contest management system 206 and may be displayable responsive to the client device transmitting a request for more contests to the contest management system 206.

The lobby 202 may show, for one or more of the contests C1 through C7 (e.g. for each contest), a sport category, a contest name or identifier, a contest style, an entry fee, a total prize pool for the contest, a total number of entries and a maximum registrant cap (which may be a dynamic cap that increases or decreases over time, or increases or decreases based on other factors such as current registrant data and/or projected registrant data), and a time corresponding to a registration deadline (e.g. a countdown to the contest going "live," or a time of the registration deadline). Other information (e.g. contest relevant information) may be displayed in place of, or in addition to, any of the information shown in FIG. 2A, and any of the information shown in FIG. 2A may be omitted as appropriate. As can be seen in FIG. 2A, the contests C1 through C7 do not have many registrants relative to their registrant cap. The registrants are dispersed over the seven contests, even though each contest has significant capacity to include or register more registrants such that all registrants could be accommodated with a smaller number of contest.

A block figure showing computer resource allocation 204 is also shown in FIG. 2A. In some embodiments, the computer resource allocation 204 can represent the total resources the system has allocated to hosting contests. As shown in FIG. 2A, each of the contests C1-C7 utilize or consume certain amounts of computer resources, which are indicated by the respective blocks shown in FIG. 2A. The computer resource allocation 204 corresponds to resources allocated by the contest management system 206 to maintain and/or update the contests C1 through C7 (e.g. processing power, processing time, time on a cloud or otherwise remote computing system, or other computer resources). As can be seen in FIG. 2A, a "free" or available amount of computer resources is small relative to the resources required to maintain or update all seven contests. As such, if the contest management system 206 needs to create or generate additional contests, the contest management system 206 may not have sufficient computer resources to do so until additional computer resources are made available to the contest management system or contests utilizing existing computer resources are terminated and free up the computer resources they were consuming.

Figure 2B:
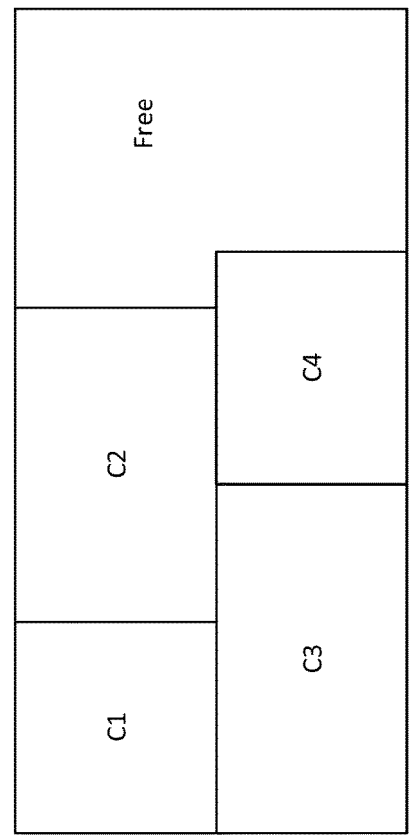
FIG. 2B depicts a contest lobby showing contests and a corresponding allocation of computer resources.

FIG. 2B shows a lobby 202 that includes contests C1 through C4. Contests for the lobby 202 shown in FIG. 2B are generated by a contest ranking system 302 (which can be included in the contest management system 206) as described herein. As can be seen in FIG. 2B, fewer contests are open for registration and as a result fewer computer resources are being utilized allowing the contest management system 206 sufficient computer resources to generate new contests. In addition to utilizing fewer computer resources, the total number of registrants in each contest, and the number of registrants as a percentage of the registrant cap of each contest, is increased as compared to the example shown in FIG. 2A. The increased number of registrations represents improved or better computer resource utilization per registrant, enabling the contest management system to scale up without needing to increase the computer resources. As there is still room in each contest C1 through C4, further registrants can still be accommodated.

As can be seen in the computer resource allocation 204 shown in FIG. 2B, resources need only be allocated for four contests. Maintaining and updating each contest may have a cost in terms of computer resources, and by lowering the total number contests to be maintained or updated, computer resources can be preserved. The computer resource allocation 204 shown in FIG. 2B shows that there are more "free" computer resources than in the example shown in FIG. 2A, in which seven contests C1 through C7 were generated.

Figure 3:
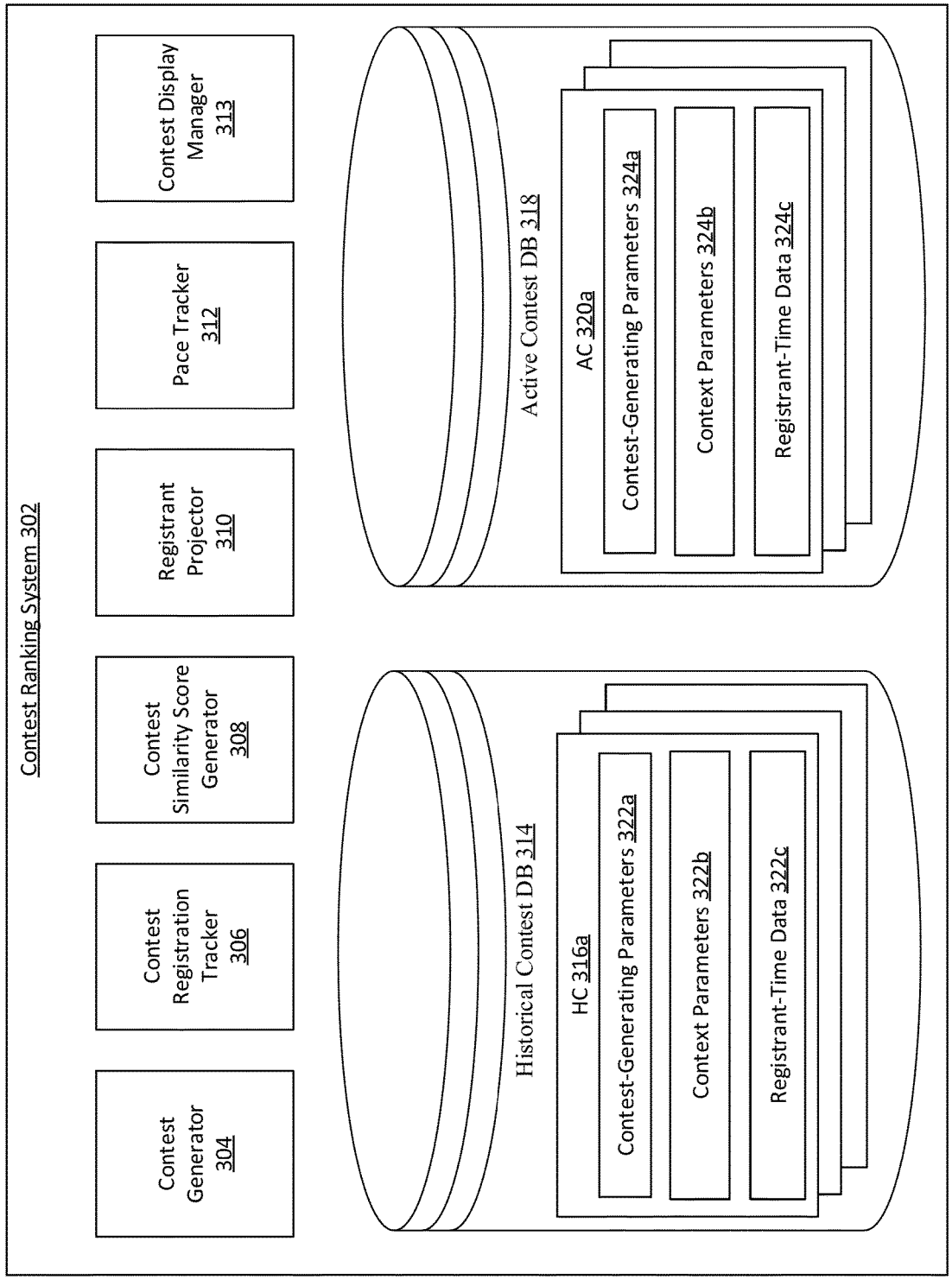
FIG. 3 is a block diagram depicting one or more embodiments of a contest ranking system.

FIG. 3 is a block diagram showing an embodiment of a contest ranking system 302. The contest ranking system 302 can be included in the contest management system 206 depicted in FIG. 1C. The contest ranking system 302 can include or be executed on one or more servers, such as the servers 106 shown in FIG. 1A. The contest ranking system 302 can include one or more applications, services, routines, servers, daemons, or other executable logics for generating a contest, including one or more of a contest generator 304, a contest registration tracker 306, a contest similarity score generator 308, a registrant projector 310, a pace tracker 312, and a contest display manager 313. The contest ranking system 302 can also include, access, maintain or manage one or more data structures, including but not limited to a historical contest database 314 (historical contest DB 314), and an active contest database 318 (active contest DB 318).

The contest generator 304 can include components, subsystems, modules, scripts, applications, or one or more sets of computer-executable instructions and can be configured to generate a contest. The contest generator 304 can be configured to generate a contest by generating a contest object based on one or more contest-generating parameter values. The contest-generating parameter values can include, for example, values for parameters including one or more of a league (e.g. NFL, MLB, NHL, NBA, a non-US league, or another sports organization), a game type (e.g. classic (with salary constraints) or pick'em (without salary constraints)), a registrant cap (e.g. a fixed cap, no cap, or a dynamic cap that changes based on demand or based on an instruction to change from another component, subsystem, module, script, or application of the contest ranking system 302), one or more games, a registration close time (e.g. a particular date and time, such as the date and time of the start of a first game of the contest), an entry fee, an eligibility specification requirement (e.g. a specification that only users having a certain experience level (e.g. as determined by a user profile) be permitted to enter the contest), a prize type (e.g. a satellite (a contest having a fixed number of entries to another contest as at least part of a prize pool), a super-satellite (a contest having a dynamic number of entries to another contest as at least part of a prize pool (e.g. the dynamic number based on number of registrants), or a normal prize type (including monetary prizes as at least part of a prize pool). The contest-generating parameter values can include any other appropriate parameter for generating a contest.

The contest generator 304 can be further configured to generate a contest at a particular timing or according to a schedule or based on upcoming games. For example, the contest generator 304 can be configured to generate one or more contests corresponding to an upcoming game, or corresponding to a set of games played on one or more days (e.g. on a particular day or in a particular week). The contest generator may be configured to generate a contest when an active contest hits its fixed registrant cap (has a number of registrants equal to a fixed registrant cap).

The contest generator 304 can be further configured to deviate from a schedule, or to generate a contest at a determined time, based on data received from another component, subsystem, module, script, or application of the contest ranking system 302. For example, the contest generator 304 can be configured to determine a time at which to generate a contest based on a pacing determined by the pace tracker 312 (e.g. a pacing of one or more active contests). The contest generator 304 can be configured to deviate from a schedule (e.g. to delay generation of a scheduled contest, or to restrict generation of a scheduled contest) based on a pacing determined by the pace tracker 312. The contest generator 304 can determine a timing for generating a new contest based on pacing information for more than one contest, and may weigh the pacing information based on features of the one or more contests (e.g. based on respective total numbers of registrants for the contests, and/or based on respective registrant caps for the contests). For example, as is described in more detail below with reference to the pace tracker 312, the pace tracker 312 may determine that one or more active contests are under-saturated (e.g. are below a projected or desired pace for the active contest, or below a projected or desired number of registrants). The contest generator 304 may be configured such that, based on or responsive to this determination, the contest generator 304 restricts generation of a scheduled contest.

The contest generator 304 may determine a time at which to generate a contest based on a policy for generating new contest. The policy may include a schedule for generating new contests including candidate times for generating a new contest. The policy may include one or more rules for determining, at one of the candidate times for generating a new contest, via the pace tracker 312 of the contest ranking system 302, whether one or more contests is under-saturated, and responsive to determining that the one or more contests is under-saturated, restricting generating a new contest at the one of the candidate times for generating a new contest. This can result in conserving computer resources by restricting the contest generator 304 from generating new contests when a number of currently active contests is determined to be sufficient to satisfy registrant needs.

The contest registrant tracker 306 can include components, subsystems, modules, scripts, applications, or one or more sets of computer-executable instructions and can be configured to track registrants for one or more contests. For example, the contest registrant tracker 306 may track, for each of one or more contests, how many users are registered for the respective active contest at a plurality of times. The contest registrant tracker 306 may maintain or reference a registrant profile that includes a plurality of time-registrant pairs for one or more contests. A registrant-time pair may include a pair of associated data that indicates a time and a corresponding number of registrants. The contest registrant tracker 306 may reference the active contest DB 318 to track registrants for active contests. The contest registrant tracker 306 may also determine registrant profile parameter values related to characteristics of registrant profiles for contests. Registrant profile data, for example, may be parametrized as registrant profile parameters (such as, for example, a maximum number of registrants, an integral of a number of registrants (e.g. between a first time and a second time), a number of registrants at a particular time (e.g. a time based on a time at which registration opened or a time based on a time at which registration closes), or parameters of a linear, exponential, or other function representing the registrant profile).

Figure 5:
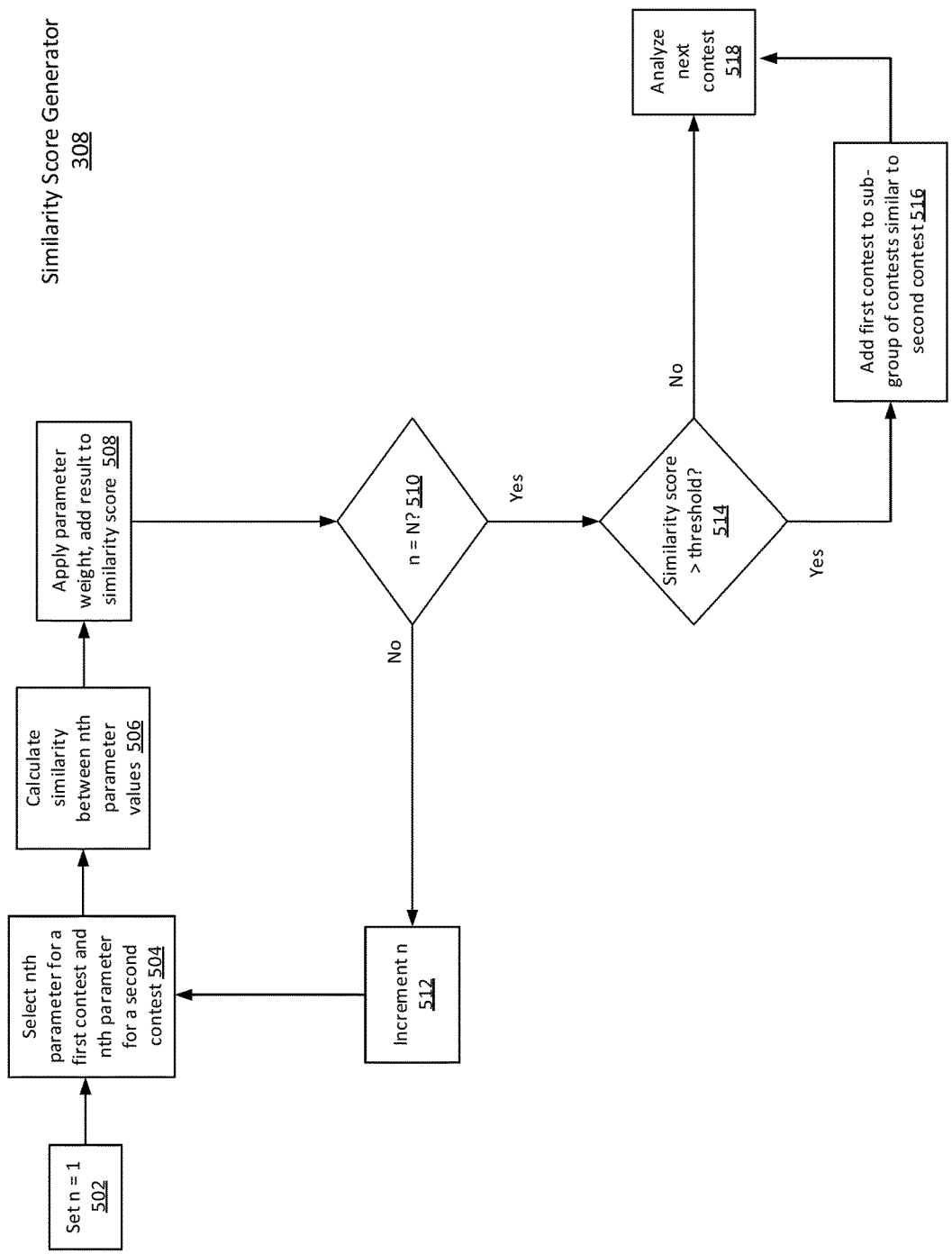
FIG. 5 is a flow chart depicting one or more embodiments of a process for determining one or more contests that are similar to a target contest.

The contest similarity score generator 308 can include components, subsystems, modules, scripts, applications, or one or more sets of computer-executable instructions and can be configured to generate a similarity score for a pair of contests, or a similarity score for a first contest and a set of one or more second contests. The contest similarity score generator 308 can determine a similarity score between a first contest and one or more second contests based on respective parameter values for parameters of the contests (e.g. contest-generating parameters of the contests and/or registrant profiles of the contests). The contest similarity score generator 308 can determine a similarity score based on determining a similarity between parameter values of parameters of the pair of contests as described herein with respect to FIG. 5. The contest similarity score generator 308 can determine the similarity score based on applying weights (e.g. pre-determined weights) to the determined similarity between parameter values. The contest similarity score generator 308 may determine a similarity score for each of a set of second contests relative to a first contest. The contest similarity score generator 308 may generate a subset of contests of the set of second contests (for which, for example, each contest of the subset of contests has a similarity score above a threshold, or for which the subset of contests includes a predetermined number of contests having the highest similarity score of the set of second contests). An example embodiment of the contest similarity score generator 308 generating a similarity score for each of a set of second contests relative to a first contest is shown in FIG. 5.

Figure 6:
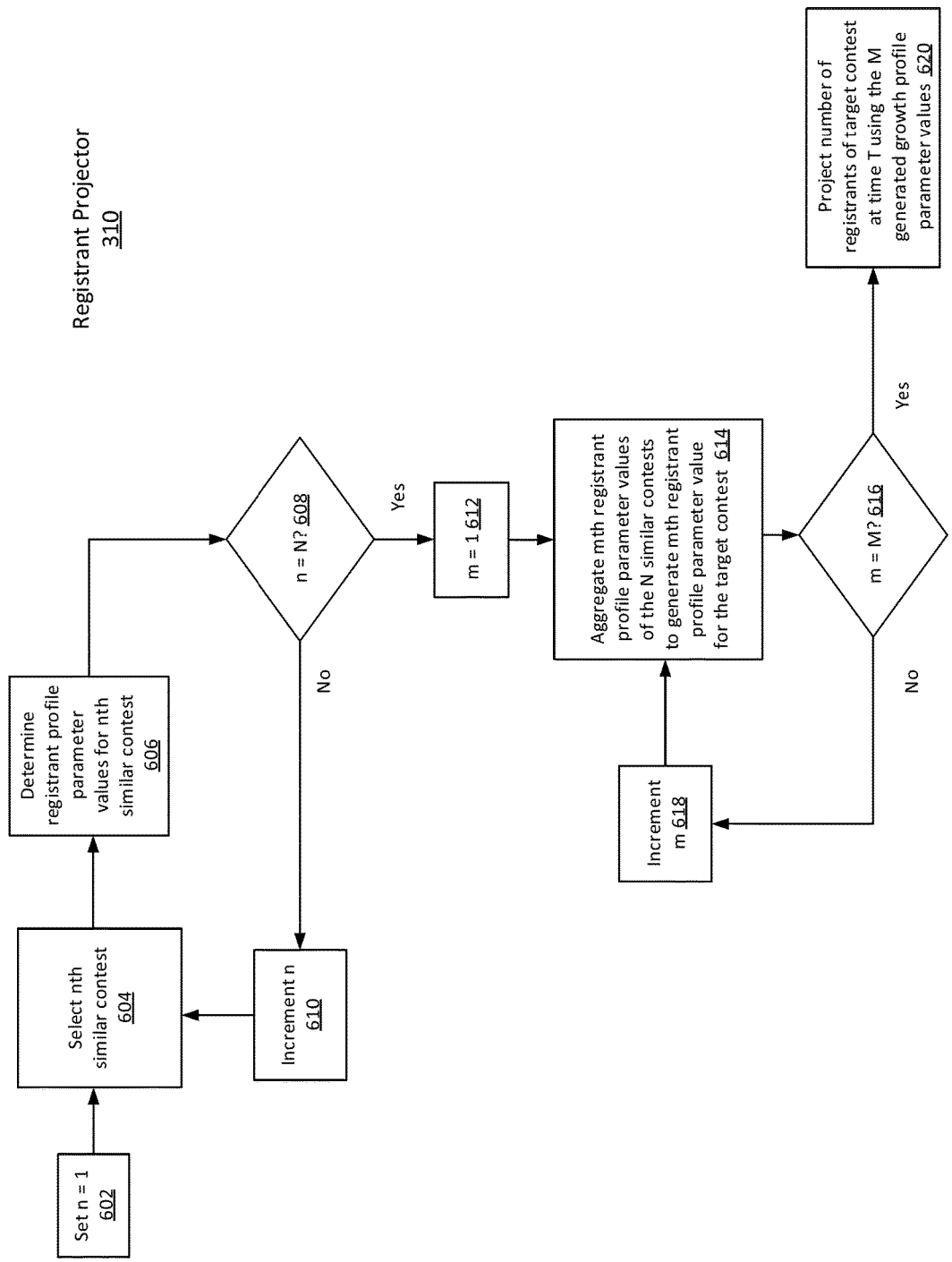
FIG. 6 is a flow chart depicting one or more embodiments of a process for projecting a number of registrants for a target contest.

The registrant projector 310 can include components, subsystems, modules, scripts, applications, or one or more sets of computer-executable instructions and can be configured to generate a projection of a future number of registrants for a contest. The registrant projector 310 can determine one or more registrant-profile parameters for a contest. For example, the registrant projector 310 can determine one or more registrant-profile parameters for a target contest based on registrant-profile parameters of contests determined by the contest similarity score generator 308 to be similar to the target contest. The determined registrant-profile parameters for the target contest can be used to project a number of registrants for the target contest at a point in time between opening of registration and close of registration for the target contest. An example of such projection by the registrant projector 310 is shown in FIG. 6, and is described in more detail below. The registrant-profile parameters may include parameters for a linear equation that is a function of time that outputs a projected number of registrants at a given time. A "projection profile" can be a set of such outputs across a span of time.

In other embodiments, the registrant projector 310 need not determine registrant-profile parameters for the target contest. The registrant projector 310 can determine a projected number of registrants for the target contest at a point in time relative to opening of registration or close of registration based on a number of registrants at a corresponding point in time for one or more similar contests (e.g. determined to be similar by the contest similarity score generator 308).

The pace tracker 312 can include components, subsystems, modules, scripts, applications, or one or more sets of computer-executable instructions and can be configured to track a pace of a contest. The pace tracker 312 can determine a projected or desired number of registrants for a target contest at a particular time (e.g. a particular time relative to opening of registration or close of registration). The projected or desired number of registrants can be determined based on registrant data or a registrant profile for one or more contests similar to the target contest. The projected or desired number of registrants can be determined based on registrant-profile parameters determined for the target contest by the registrant projector 310.

The pace tracker 312 can determine a difference between a number of registrants for the target contest at a point in time (e.g. a current number of registrants) and the projected or desired number of registrants for the point in time. In this manner, the pace tracker 312 can determine if the target contest is below pace or above pace, and to what degree the target contest is below pace or above pace. The contest generator 304 can use this determination to determine a timing for generating a new contest. For example, if the target contest is below pace, the contest generator 304 may delay or restrict generating a new contest as described above. One or more embodiments of methods of using the pace tracker 312 are described herein with reference to FIG. 7A and FIG. 7B.

The pace tracker 312 can further rank contests based on respective pace statuses. For example, the pace tracker 312 can determine, for each contest of a plurality of contests, to what degree the contest is under-saturated or below pace (e.g. by how many participants the contest is below pace, or by a percentage difference between an "on pace" number of participants (e.g. the projected or desired number of participants) and the projected pace, either at the current time or at a future time (e.g. at close of registration)). The pace tracker 312 can determine a rank for each of the plurality of contests (or for a sub-set of the plurality of contests having being under-saturated or below pace to a degree that is equal to or greater than a threshold) based on the pace statuses. The pace tracker 312 can determine a high rank for a contests that is most under-saturated or below pace.

The contest display manager 313 can include components, subsystems, modules, scripts, applications, or one or more sets of computer-executable instructions and can be configured to manage display of a contest on a client device (such as a client 102). The contest display manager 313 can provide data corresponding to a layout of a contest display, such as a lobby 202 as shown in FIG. 2A.

The contest display manager 313 can determine a layout of the contest display that includes one or more predetermined locations for displaying contests based on projections or rankings determined by the pace tracker 312. For example, the contest display manager 313 can determine a layout that includes displaying, on a page or tab of the contest display, only contests that are below pace or that are below pace to a degree that is equal to or above a threshold, or displaying such below pace contests in a predetermined location (e.g. in a prominent position in the lobby, such as at the top or start of a list of contests), or can display such below-pace contests according to one or more features, such as a stylistic feature (e.g. a particular text style (which can specify a size, a font, underlining, bold, italics, or another style, and in some embodiments the particular text style is different than another style used in the contest display), a visual indicator associated with such below pace contests (e.g. a box, circle, or other visual indicator that surrounds or is otherwise positioned relative to the below pace contests), or any other appropriate feature.

The contest display manager 313 can determine a layout that includes prominently displaying (e.g. on a front page or tab of the display, or high up in a list of contests) contests based on a display score or a contest match score. The display score or match score may be determined by a contest recommendation system, such as the contest recommendation system 1002 described herein in reference to FIG. 10. The contest recommendation system 1002 may determine the display score or match score based on the projections or the rankings determined by the pace tracker 312 (e.g. may include an under-saturation score as a sub-score for a total contest match score). The contest display manager 313 may use rankings determined by the contest recommendation system 1002 to determine the layout for the contest display. Thus, a contest that is determined to be below pace may be displayed more prominently than would otherwise be the case.

The historical contest DB 314 can include one or more data structures that store one or more historical contests 316. A historical contest 316 can be a contest for which registration is closed. For example, the historical contest DB 314 can store a historical contest 316a, 316b, 316c, or more historical contests. The historical contest 316a can include data 322, including contest-generating parameters 322a, context parameters 322b, and registrant-time data 322c. Each of the historical contests stored in the historical contest DB 314 can include contest-generating parameters, context parameters, and registrant-time data. The historical contest DB 314 is described in more detail below with respect to FIG. 4A.

The active contest DB 318 can include one or more data structures that store one or more active contests 320. An active contest 320 can be a contest for which registration is open, or a contest for which registration has not yet opened. For example, the active contest DB 318 can store an active contest 320a, 320b, 320c, or more active contests. The active contest 320a can include data 324, including contest-generating parameters 324a, context parameters 324b, and registrant-time data 324c. Each of the active contests stored in the active contest DB 318 can include contest-generating parameters, context parameters, and registrant-time data. The active contest DB 318 is described in more detail below with respect to FIG. 4B.

Figure 4A:
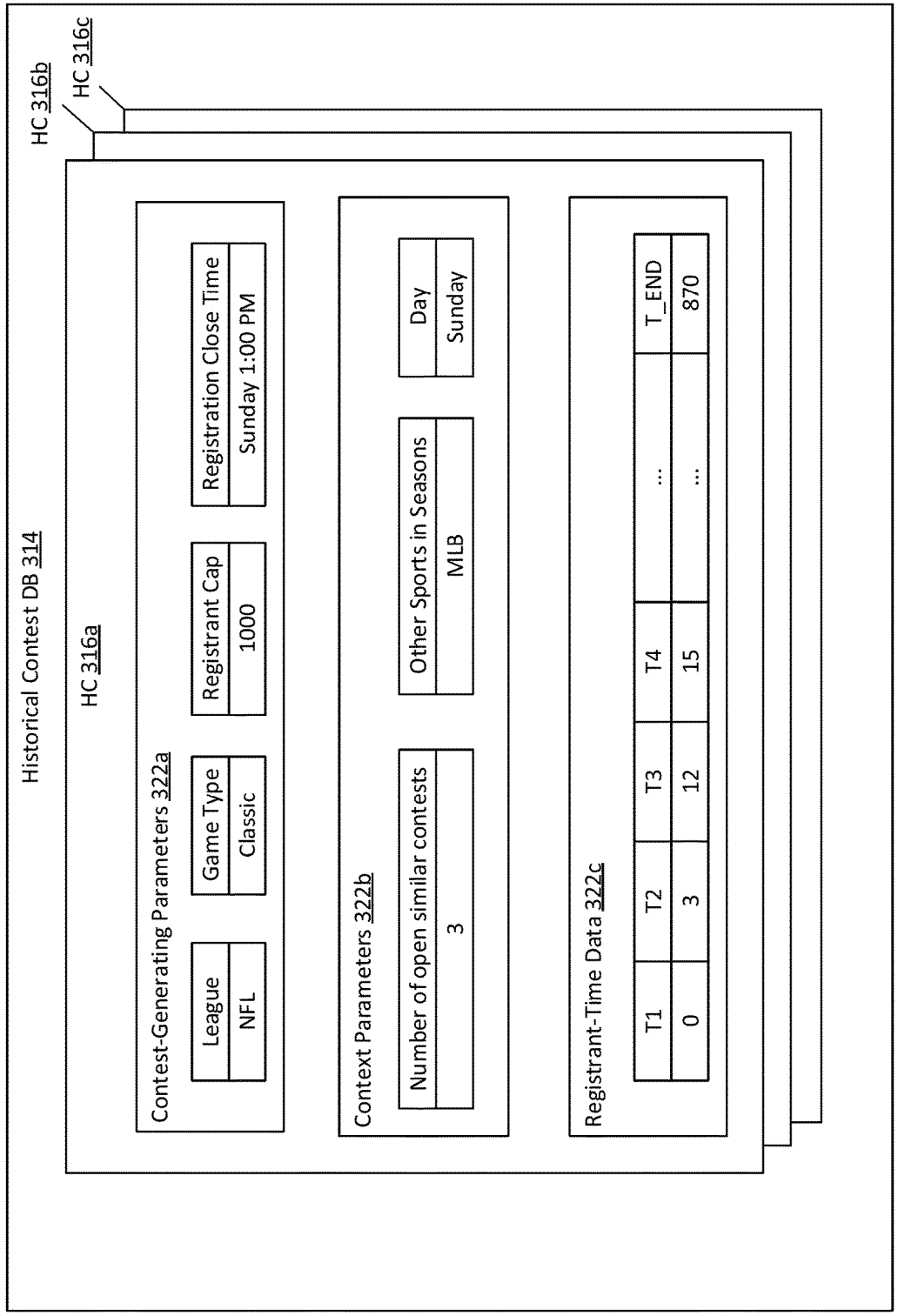
FIG. 4A is a block diagram depicting one or more embodiments of a historical contest database.

Referring now to FIG. 4A, FIG. 4A shows a historical contest DB 314 including a historical contest 316a, a historical contest 316b, and a historical contest 316c. The historical contest 316a includes data 322 including contest-generating parameters 322a, context parameters 322b, and registrant-time data 322c. The contest-generating parameters can be, or can be based on, any parameters used (e.g. by the contest generator 304) to generate the historical contest 316a. As described above, the contest-generating parameters can include, for example, one or more of a league, a game type, a registrant cap, one or more games, a registration close time, an entry fee, an eligibility specification requirement, a prize type, or any other parameters used for generating a contest.

The context parameters relate to a context for the historical contest 316a. The context can include, for example, whether sports other than the sport of the historical contest 316a were in season during the registration period of the historical contest 316a. If other sports were in session, the number of registrants for the historical contest 316a may have been depressed, and using a context parameter related to this to account for such information (e.g. by the registrant projector 310) would be useful. Another context parameter may indicate, for example, a day of the week on which registration for the historical contest 316a closed, or whether registration for the historical contest 316a closed on a weekend or on a weekday.

The context parameters can also relate to information related to other contests, such as a number of contests running concurrently with, or in close temporal proximity to (e.g. within one hour of, within 2 hours of, within 5 hours of, within one day of, within two days of, or within a week of) the historical contest 316a. Running concurrently with, or in close temporal proximity to, the historical contest 316a can refer to contests that have an overlapping registration period, or that have registration periods that are separated by a small amount of time (such as one hour, 2 hours, 5 hours, one day, two days, or one week). For example, such context parameters can include an average number of concurrent active contests during the registration period of the historical contest 316a, or an average number of concurrent active contests during a time period of interest within the registration period of the historical contest 316a (e.g. within the last hour of registration of the historical contest 316a, or at close of registration). These averages may be averages of contests determined to be similar to the historical contest 316a by the contest similarity score generator 308. Another context parameter may be an indicator of a number of registrants of contests running concurrently with, or in close temporal proximity to, the historical contest 316a.

The historical contest 316a further includes registrant-time data 324c. The registrant-time data 324c can include time—number-of-registrant pairs (pairs of associated data) indicating a number of registrants at a plurality of times T1 through T_END. T1 may correspond to a time at which registration of the historical contest 316a opened, and time T_END may correspond to a time at which registration of the historical contest 316a closed. The registrant-time data 324c may also include registrant profile parameters for the historical contest 316a.

Figure 4B:
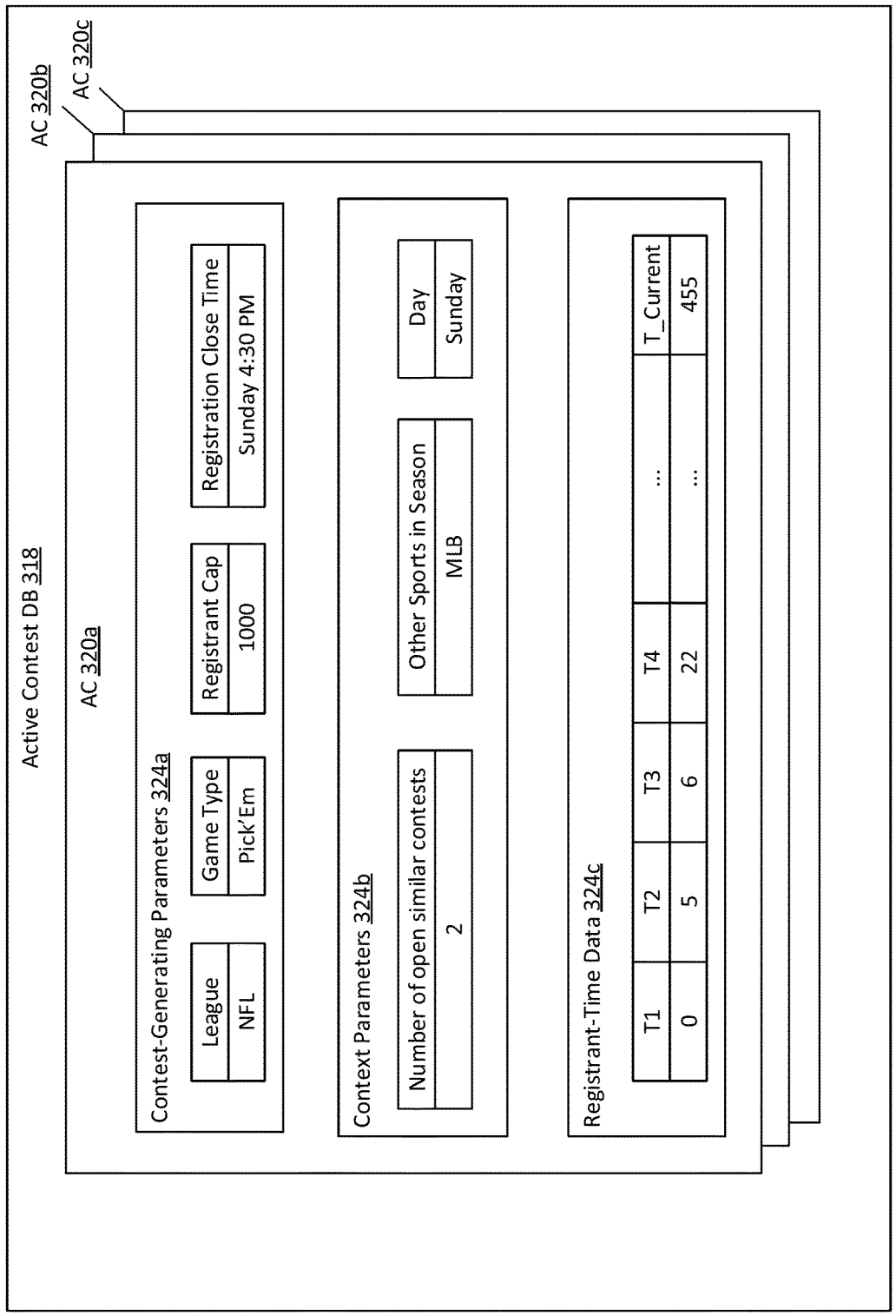
FIG. 4B is a block diagram depicting one or more embodiments of an active contest database.

Referring now to FIG. 4B, FIG. 4B shows an active contest DB 318 including an active contest 320a, an active contest 320b, and an active contest 320c. The active contest 320a include contest-generating parameters 324a, context parameters 324b, and registrant-time data 324c. The active contest DB 318 may include contests for which registration is currently open, or contests for which registration has not yet begun (and may not yet be presented in the lobby 202). The contest-generating parameters 324a, context parameters 324b, and registrant-time data 324c may be similar to the contest-generating parameters 322a, context parameters 322b, and registrant-time data 322c of the historical contest 316a, except that the registrant-time data 322c of the active contest 320a may only include time—number-of-registrant pairs up to a current time (T_Current), rather than up to T_END, as registration has not yet closed for the active contest 320a.

Referring now to FIG. 5, FIG. 5 shows an example embodiment of a process for generating a similarity score between a first contest and a second contest. This can be used to determine a set of first contests that are similar to a second (target) contest, and the registrant projector 310 can perform analysis using the set of similar first contests to project a number of registrants for the second contest, as described herein. The process can be performed by the contest similarity score generator 308. In a brief overview, the contest similarity score generator 308 can set a parameter index "n" to one, or some initial value (BLOCK 502). The contest similarity score generator 308 can select an nth parameter for a first contest (e.g. a historical or active contest), and an nth parameter for a second contest (e.g. a target contest) (BLOCK 504). The contest similarity score generator 308 can calculate a similarity between the parameter values of the nth parameter for the first contest and the nth parameter for the second contest (BLOCK 506). The contest similarity score generator 308 can apply a parameter weight to the calculated similarity, and can add the result to a total similarity score (BLOCK 508). The contest similarity score generator 308 can determine whether the index n is equal to N (a total number of parameters being considered by the contest similarity score generator 308) (BLOCK 510).

If the contest similarity score generator 308 determines that the index n is not equal to N, the process proceeds to BLOCK 512, and the contest similarity score generator 308 can then increment n, and the process can proceed to BLOCK 504. If the contest similarity score generator 308 determines that the index n is equal to N, the process proceeds to BLOCK 514, and the contest similarity score generator 308 can determine whether the similarity score is less than (or, in other embodiments, equal to) a threshold, such as a pre-determined threshold. If the contest similarity score generator 308 determines that the similarity score is below the threshold, the process proceeds to BLOCK 516, and the first contest is added to a sub-group of contests (a sub-group of the contests being analyzed) that are similar to the second (target) contest. The process then proceeds to BLOCK 518, and a next contest is analyzed for similarity with respect to the second contest, or the process may end. If, at BLOCK 514, the contest similarity score generator 308 determines that the similarity score is not below the threshold, the process proceeds directly to BLOCK 518, or ends.

In more detail, at BLOCK 504, the contest similarity score generator 308 can select an nth parameter of a first contest (e.g. a historical contest). The nth parameter may be any of the contest parameters described herein, such as, for example, a contest-generating parameter or a context parameter. The nth parameter may be a registrant profile parameter. The contest similarity score generator 308 may further select an nth parameter of a second contest. The nth parameter may correspond to the nth parameter of the first contest (e.g. may be the same parameter).

At BLOCK 506, the contest similarity score generator 308 may calculate a similarity between the value for the nth parameter of the first contest and the value for the nth parameter of the second contest. This similarity may be based on a direct similarity (e.g. if the parameter is an entry fee, the similarity may correspond to a difference between the respective entry fees of the first contest and the second contest), or may be a similarity determined in some other manner, such as by reference to a look-up table (LUT). The LUT may be accessible to the contest similarity score generator 308, and may describe a number of "similarity points" that correspond to parameter value pairs for particular parameters. For example, if the parameter is a day of the week, and the first parameter value correspond to Saturday and the second parameter value corresponds to Sunday, the LUT may indicate that a first number of similarity points corresponds to this difference in parameter values for the day-of-the-week parameter. If the first parameter value correspond to Wednesday and the second parameter value corresponds to Sunday, the LUT may indicate that a second number of similarity points smaller than the first number corresponds to this difference in parameter values for the day-of-the-week parameter, indicating a greater similarity between a Saturday-Sunday pair than between a Wednesday-Sunday pair. Parameter values may correspond to parameter value groups (e.g. to a "small entry fee" group, or to a "large entry fee" group), and similarities between corresponding groups may be determined rather than directly determining similarities between the parameter values.

At BLOCK 508, the contest similarity score generator 308 may apply a weight corresponding to the nth parameter to the similarity (e.g. to the similarity points) calculated at BLOCK 506. The weight may be, for example, a predetermined weight. The weight may be a weight determined by a machine learning algorithm trained on a set of contests (e.g. a set of contests including annotations indicating similarity between the contests). This can provide for weighing parameter value similarities according to the importance of the corresponding parameter, and can provide for an improved method of generating a similarity score.

As described above, at BLOCKs 514-516, the contest similarity score generator 308 may determine that a similarity score is greater than a pre-determined threshold, and responsive to this determination may assign the first contest to a sub-group, the sub-group including contests similar to the second contest. This sub-group of contests similar to the second contest can be used in subsequent analysis, as described herein. Using the sub-group of similar contests, rather than analyzing every contest for which data is stored, can provide for more efficient and less computer-resource-intensive analysis. For example, the registrant projector 310 may perform analysis on a group of contests to generate a projected number of registrants for the second contest. By limiting the analysis to only those contests that are similar to the second contest and omitting other contests, the registrant projector 310 may use less computing resources to perform the analysis.

Referring now to FIG. 6, FIG. 6 shows an example embodiment of a process for generating a projected registrant profile, and for projecting a number of registrants for a contest. The process can be performed by the registrant projector 310. In a brief overview, the registrant projector 310 can set an index "n" of contests similar to a target contest to 1 (or some other initial value) (BLOCK 602). The registrant projector 310 can select the nth similar contest of a group of similar contests (e.g. a sub-group of similar contests determined by the process depicted in FIG. 5) (BLOCK 604). The registrant projector 310 can determine a number M registrant profile parameters for the nth similar contest (BLOCK 606). The registrant projector 310 can determine whether the index n is equal to a total number of similar contest N (BLOCK 608). If the registrant projector 310 determines that the index n is not equal to a total number of similar contest N, the process proceeds to BLOCK 610, the registrant projector 310 increments the index n, and the process proceeds to BLOCK 604. If the registrant projector 310 determines that the index n is equal to the total number of similar contest N, the process proceeds to BLOCK 612, and the registrant projector 310 sets an index m of registrant profile parameters to 1 (or some other initial value). The registrant projector 310 can aggregate the respective mth registrant profile parameter values of the N similar contests to generate an mth registrant profile parameter value for the target contest (BLOCK 614). The registrant projector 310 can determine whether the index m is equal to the total number of registrant profile parameters M (BLOCK 616). If the registrant projector 310 determines that the index m is not equal to the total number of registrant profile parameters M, the process proceeds to BLOCK 618, the registrant projector 310 increments m, and the process proceeds to BLOCK 614. If the registrant projector 310 determines that the index m is equal to the total number of registrant profile parameters M, the process proceeds to BLOCK 620, and the registrant projector 310 can generate a projection of a number of registrants for the target contest at a time T, using the M generated registrant profile parameters.

In further detail, at BLOCK 604, the registrant projector 310 can select an nth similar contest from a group of contests determined by the contest similarity score generator 308 to be similar to the target contest. At BLOCK 606, registrant projector 310 can determine registrant profile parameters for the nth similar contest. The registrant profile parameters for the nth similar contest can be generated dynamically during the process depicted in FIG. 6, or can be retrieved by the registrant projector 310 (e.g. from a database, such as the historical DB 314). The registrant profile parameters for the nth similar contest can be generated as described above with reference to FIG. 3.

At BLOCK 614, the registrant projector 310 can aggregate the respective mth registrant profile parameter values of the N similar contests to generate an mth registrant profile parameter value for the target contest. The registrant projector 310 can aggregate the respective mth registrant profile parameters based on weights. For example, the weights can be, or can be based on, similarity scores calculated by the contest similarity score generator 308 for the target contest—nth similar contest pairs. In this way, contests that are more similar to the target contest than are other contests are accorded more weight in the determination of registrant profile parameter values for the target contest, which may lead to a more accurate projection. The weights can be calculated using a machine-learning algorithm (e.g. a machine-learning algorithm that implements a similarity score as a feature). Such a machine-learning algorithm can, for example, be trained on an annotated data set that includes complete registrant-time data for a plurality of contests as well as corresponding similarity scores. The weights determined by the machine-learning algorithm can, when used in the process shown in FIG. 6, provide for determining accurate registrant profile parameters for a target contest and for an accurate projection of a number of registrants for the target contest at a time T. At BLOCK 620, the registrant projector 310 can project a number of registrants for the target contest at a time T, using the M generated registrant profile parameter values for the target contest. For example, the registrant projector 310 can determine an equation describing a number of registrants for the target contest as a function of time based on the M generated registrant profile parameters for the target contest. This equation can be used to project the number of registrants for the target contest at an arbitrary time.

Referring now to FIG. 7A, FIG. 7A shows a projection profile 702 for an active target contest. The projection profile 702 can in the depicted example is generated at time T0 (e.g. at an opening of registration for the active target contest). The projection profile 702 shows a projected number of registrants for the target contest as a function of time, for a plurality of times up until a time at which registration closes. FIG. 7A also shows an actual profile 704, which shows an actual number of registrants for the target contest, up to a time T1 (e.g. a current time). A differential 710 shows a difference between the projected number of registrants at time T1 708 and the actual number of registrants at time T1 (706). As can be seen, the actual number of registrants at time T1 is below the projected number. This may indicate that the target contest (and may imply that other active contests) are under-saturated. The pace tracker 312 may determine the differential 710 at a time T1. The pace tracker 312 may determine the differential 710 at a time T1 based on a schedule for pace-tracking, such as checking every predetermined amount of time (e.g. by checking every second, every two seconds, or every three second, or any appropriate amount of time), or such as checking at one or more predetermined times). The pace tracker 312 may determine that the differential is above a threshold, and based on this determination, the pace tracker 312 may instruct the contest generator 304 to restrict or to delay generation of a new contest (e.g. by interrupting or revising a schedule for generating new contests). Alternatively, the contest generator 304 may request that the pace tracker 312 determine the differential 710 as part of a policy for generating a new contest, and the contest generator 304 may determine to restrict or delay generation of a new contest based on the differential 710 being above a threshold. The contest generator 304 may request that the pace tracker 312 determine a differential for a plurality of contests to, for example, generate a total under-saturation score, and may restrict or delay generation of a new contest based on the total under-saturation score. This can help to conserve computer resources, and may avoid opening, maintaining and updating unnecessary contests. An example embodiment of this process is described herein in reference to FIG. 8B.

Referring now to FIG. 7B, FIG. 7B shows a projection profile 712 generated at the time T1 and an updated actual profile 704 at a time T2. The projection profile 712 can be determine by the registrant projector 310 at the time T1 or based on information determined at the time T1. The projection profile 712 can represent an updated projection profile for the active target contest. The projection profile 712 can be updated every predetermined amount of time (e.g. by checking every second, every two seconds, or every three second, or any appropriate amount of time), or by updating at one or more predetermined times. The projection profile 712 can be generated at the time T1 based on updated registrant profile parameter values. The current registrant profile parameter values may change if the contest similarity score generator 308 makes updated determinations as to which contests are "similar" to the target contest (based on updated registrant-time data for the target contest), and the registrant projector 310 may thus determine updated registrant profile parameter for the target contest based on the updated set of similar contests to generate an updated projected final number of registrants. The registrant profile parameter values can be updated using Kalman filtering or linear quadratic estimation. The registrant profile parameter values can be updated based on a weighted average of older registrant profile parameters (e.g. determined at the time T0) and new registrant profile parameters (e.g. determined at the time T1). The weighs may be based on (e.g. proportional to) a differential between actual registrants and projected registrants for the respective times. For example, the registrant profile parameters determined at time T0 may be weighted based on the differential 710, and the registrant profile parameters determined at time T1 may be weighted based on the differential 718, and a weighted average of these registrant profile parameters may be used as the updated registrant profile parameters. In this manner, the projections can be performed dynamically to project whether one or more active contests will be under-saturated at close of registration.

FIG. 7B also shows a differential 718 between a projected number of registrants 714 at time T2 and an actual number of registrants 716 at time T2. The differential 718 at time T2 is smaller than the differential 710 at time T1, showing that the saturation of the target contest is improved (e.g. as a result of the contest generator 304 determining to restrict or delay generation of a new contest at time T1). The pace tracker 312 may determine that the differential 718 is below a threshold, and based on this determination the contest generator 304 may generate a new contest (e.g. according to a schedule or policy for generating new contests).

In other embodiments, a desired number of final registrants (e.g. at close of registration) is compared to a current projected final number of registrants determined based on current registrant profile parameter values, and the pace tracker 312 determines a differential between the desired number of final registrants and the current projected final number of registrants. If this differential is above a threshold, the contest generator 304 may restrict or to delay generation of a new contest (e.g. in any of the manners described above).

Figure 8A:
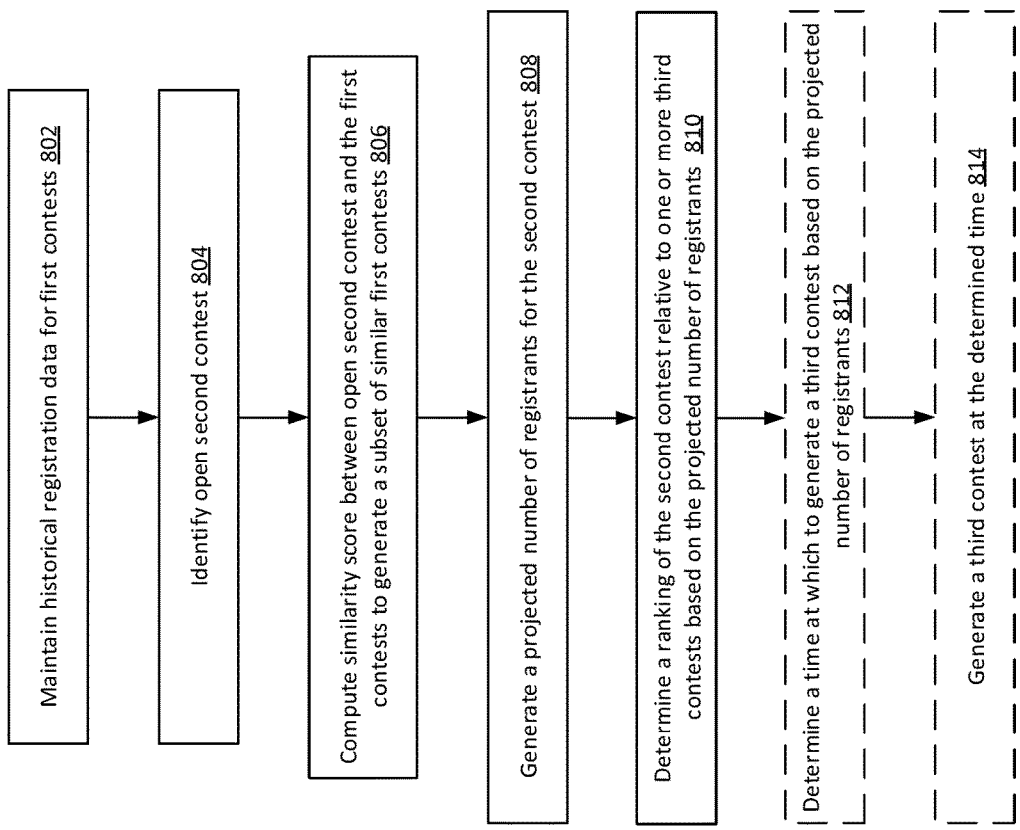
FIG. 8A shows a process for generating a contest at a determined time.

Referring now to FIG. 8A, FIG. 8A shows a process for generating a contest at a determined time. As described above, in a brief overview, the contest ranking system 302 can maintain historical registration data for one or more first contests (e.g. in the historical contest DB 314) (BLOCK 802). The contest similarity score generator 308 can identify an open or active second contest (e.g. by referencing the active contest DB 318) (BLOCK 804). The contest similarity score generator 308 can determine a similarity score between the active second contest and each of the first contests to generate a subset of similar contests (BLOCK 806). The registrant projector 310 can generate a projected number of registrants for the second contest at a time T (BLOCK 808). The pace tracker 312 can determine a ranking of the second contest relative to one or more third contests based on the projected number of registrants (BLOCK 810). The contest generator 304 can determine a time at which to generate a fourth contest based on the projected number of registrants (BLOCK 812). The contest generator 304 can generate the fourth contest at the determined time (BLOCK 814).

At BLOCK 802, the contest ranking system 302 can maintain historical registration data for one or more first contests (e.g. in the historical contest DB 314). The contest ranking system 302 can store the historical registration data for the one or more first contests, and can update the historical registration data for the one or more first contests. This can include storing one or more parameters for the one or more first contests (e.g. contest-generating parameters and context parameters), and can include storing and update time-registrant data pairs that indicate numbers of registrants at particular times for the one or more first contests (e.g. times between an opening of registration for the contest and close of registration for the one or more first contest).

At BLOCK 804, the contest similarity score generator 308 can identify an open or active second contest. The contest similarity score generator 308 can identify the open or active second contest by referencing the active contest DB 318. The active contest DC 318 can be maintained by the contest ranking system 302, which can include storing one or more parameters for the second contest (e.g. contest-generating parameters and context parameters), and can include storing and update time-registrant data pairs that indicate numbers of registrants at particular times for the second contest (e.g. times between an opening of registration for the second contest and close of registration for the second contest). The contest similarity score generator 308 can reference this information to identify the open or active second contest.

At BLOCK 806, the contest similarity score generator 308 can determine a similarity score between the active second contest and each of the first contests to generate a subset of similar contests. The contest similarity score generator 308 can determine a similarity score between the first contests and the second contests based on respective parameter values for parameters of the contests (e.g. contest-generating parameters of the contests and/or registrant profiles of the contests). The contest similarity score generator 308 can determine a similarity score based on determining a similarity between parameter values of parameters of the pair of contests as described herein with respect to FIG. 5. The contest similarity score generator 308 can determine the similarity score based on applying weights (e.g. pre-determined weights) to the determined similarity between parameter values. The contest similarity score generator 308 may determine a similarity score for each of the first contests relative to the second contest. The contest similarity score generator 308 may generate a subset of contests of the set of first contests (for which, for example, each contest of the subset of contests has a similarity score above a threshold, or for which the subset of contests includes a predetermined number of contests having the highest similarity score of the set of first contests). An example embodiment of the contest similarity score generator 308 generating a similarity score for each of a set of first contests relative to a second contest is shown in FIG. 5.

At BLOCK 808, the registrant projector 310 can generate a projected number of registrants for the second contest at a time T. The registrant projector 310 can determine one or more registrant-profile parameters for the second contest. For example, the registrant projector 310 can determine one or more registrant-profile parameters for the second contest based on registrant-profile parameters of contests determined by the contest similarity score generator 308 to be similar to the second contest. The determined registrant-profile parameters for the second contest can be used to project a number of registrants for the second contest at a point in time between opening of registration and close of registration for the second contest. An example of such projection by the registrant projector 310 is shown in FIG. 6. The registrant-profile parameters may include parameters for a linear equation that is a function of time that outputs a projected number of registrants at a given time. A "projection profile" can be a set of such outputs across a span of time.

At BLOCK 810, the pace tracker 312 can determine a ranking of the second contest relative to one or more third contests based on the projected number of registrants. The pace tracker 312 can rank the second contest and the third contests based on respective pace statuses. For example, the pace tracker 312 can determine, for the second contest and for each contest of the plurality of third contests, to what degree the contest is under-saturated or below pace (e.g. by how many participants the contest is below pace, or by a percentage difference between an "on pace" number of participants (e.g. the projected or desired number of participants) and the projected pace, either at the current time or at a future time (e.g. at close of registration)). The pace tracker 312 can determine a rank for the second contest each of the plurality of third contests (or for a sub-set of the plurality of third contests having being under-saturated or below pace to a degree that is equal to or greater than a threshold) based on the pace statuses.

At BLOCK 812, the contest generator 304 can determine a time at which to generate a fourth contest based on the projected number of registrants, and at BLOCK 814, the contest generator 304 can generate the fourth contest at the determined time. The contest generator 304 can be further configured to generate the fourth contest at a particular timing or according to a schedule or based on upcoming games. For example, the contest generator 304 can be configured to generate the fourth contest corresponding to an upcoming game, or corresponding to a set of games played on one or more days (e.g. on a particular day or in a particular week). The contest generator may be configured to generate the fourth contest when an active contest hits its fixed registrant cap (has a number of registrants equal to a fixed registrant cap). In some embodiments, the operations of BLOCK 812 may be omitted.

The contest generator 304 can be further configured to generate the fourth contest at a determined time based on data received from another component, subsystem, module, script, or application of the contest ranking system 302. For example, the contest generator 304 can be configured to determine a time at which to generate the fourth contest based on a pacing determined by the pace tracker 312 (e.g. a pacing of one or more active contests). The contest generator 304 can be configured to deviate from a schedule (e.g. to delay generation of the fourth contest, or to set generation of the fourth contest to a time T) based on a pacing determined by the pace tracker 312. The contest generator 304 can determine a timing for generating the fourth contest based on pacing information for more than one contest, and may weigh the pacing information based on features of the one or more contests (e.g. based on respective total numbers of registrants for the contests, and/or based on respective registrant caps for the contests). For example, as is described in more detail herein with reference to the pace tracker 312, the pace tracker 312 may determine that one or more active contests are under-saturated (e.g. are below a projected or desired pace for the active contest, or below a projected or desired number of registrants). The contest generator 304 may be configured such that, based on or responsive to this determination, the contest generator 304 delays generation of the fourth contest (e.g. sets a time for generating the fourth contest to be later than a time include in a schedule). In some embodiments, the operations of BLOCK 814 may be omitted.

The contest generator 304 may determine a time at which to generate the fourth contest based on a policy for generating new contest. The policy may include the schedule for generating new contests including the fourth contest, and may include candidate times for generating the fourth contest. The policy may include one or more rules for determining, at one of the candidate times for generating the fourth contest, via the pace tracker 312 of the contest ranking system 302, whether one or more contests is under-saturated, and responsive to determining that the one or more contests is under-saturated, delaying generating the fourth contest at the one of the candidate times for generating a new contest. This can provide for in conserving computer resources by restricting the contest generator 304 from generating new contests when a number of currently active contests is determined to be sufficient to satisfy registrant needs.

Figure 8B:
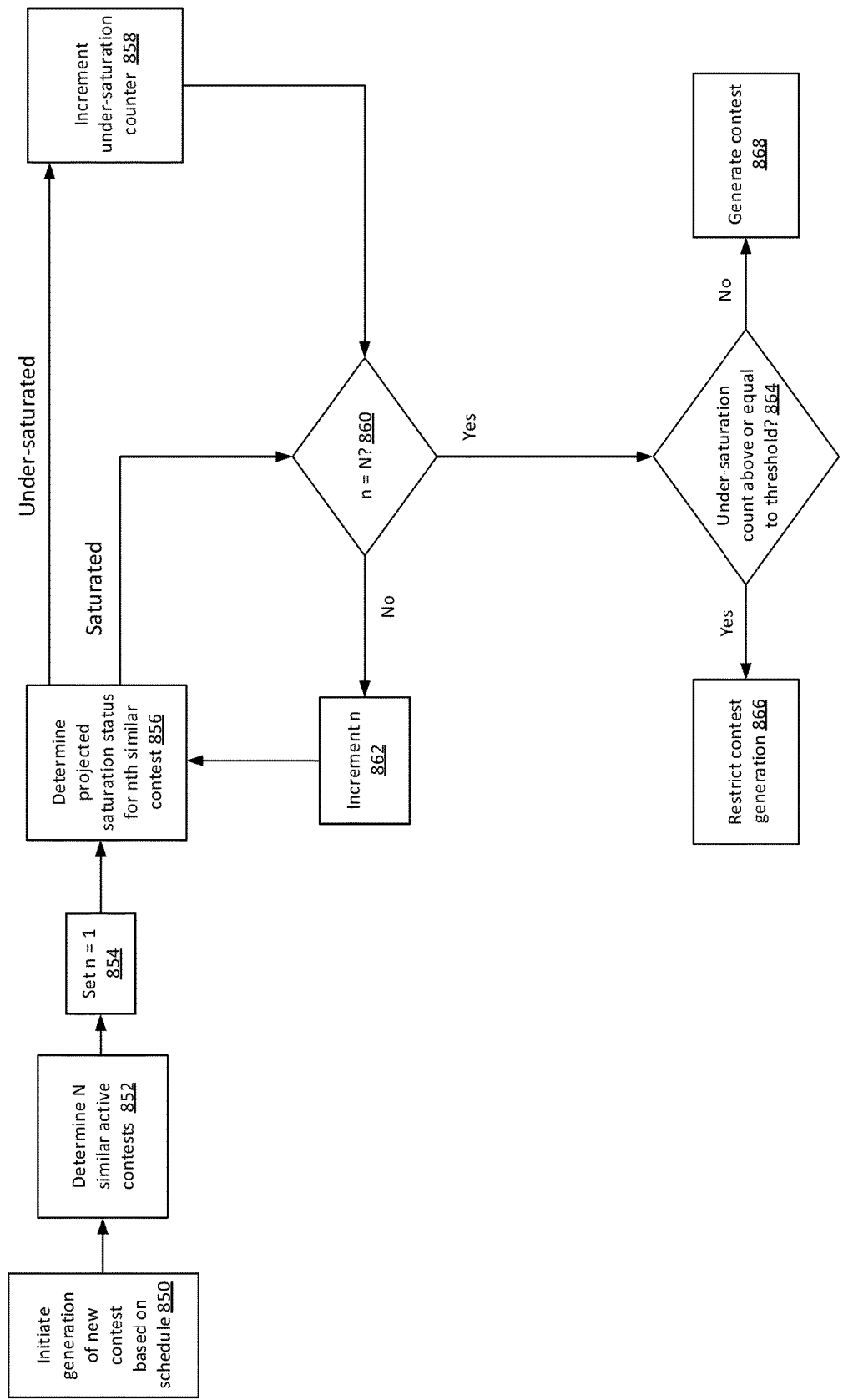
FIG. 8B shows an example embodiment of a process for generating a contest based on a schedule.

Referring now to FIG. 8B, FIG. 8B shows an example embodiment of a process for generating a contest based on a schedule. This can provide for an improved allocation of computing resources (e.g. by restricting generation of new contests when active contests are projected to be under-saturated (have a number of registrants below a predetermined threshold)). The process can be performed by the contest generator 304. In a brief overview, the contest generator 304 can initiate generation of a new contest based on a schedule (BLOCK 850). The contest generator 304 can determine N similar active contests (BLOCK 852). The contest generator 304 can set a parameter index "n" to one, or some initial value (BLOCK 854). The contest generator 304 can determine a projected saturation status for an nth similar contest of the N similar contests (BLOCK 856). If the projected saturation status is "under-saturated", the process proceeds to BLOCK 858, the contest generator 304 increments an under-saturation counter, and the process proceeds to BLOCK 860. Otherwise, the process proceeds directly to BLOCK 860.

The contest generator 304 determines whether the index n is equal to N. If the index n is not equal to N, the process proceeds to BLOCK 862, the contest generator 304 increments the index n, and the process proceeds to BLOCK 856. Otherwise, the process proceeds to BLOCK 864. The contest generator 304 determines whether an under-saturation count is above or equal to a predetermined threshold (BLOCK 864). If the under-saturation count is not above or equal to a predetermined threshold, the process proceeds to BLOCK 866, and the contest generator 304 restricts contest generation. Otherwise, the process proceeds to BLOCK 868, and the contest generator 304 generates the new contest.

In more detail, referring to BLOCK 850, the contest generator 304 can initiate generation of a new contest based on a schedule. The new contest can be generated based on a set of contest-generating parameters. The schedule can be, for example, a list of timings at which to generate a new contest, or can be an instruction received from another component of the contest ranking system 302 to start a new contest, or can be a policy for generating a new contests. The schedule can specify the contest-generating parameters for the new contest. The contest generator 304 can determine that the schedule demands initiating generation of a new contest, and can begin the process shown in FIG. 8B.

At BLOCK 852, the contest generator 304 can determine N similar active contests relative to the new contest. For example, the contest similarity score generator 308 can determine N similar active contests based on the contest-generating parameters of the new contest, and can provide an identification or count of the N similar active contests to the contest generator 304.

At BLOCK 854, the contest generator 304 can initialize an index n (e.g. to 1, or to some other initial value). The index n can correspond to the N similar active contests determined at BLOCK 852.

At BLOCK 856, the contest generator 304 can determine can determine a projected saturation status for an nth active contest of the N similar active contests. The projected saturation status can be determine by the registrant projector 310, and can be based on a determination of whether a projected number of registrants for the nth active contest at a time T (e.g. at close of registration) is equal to or above a predetermined threshold. The registrant projector 310 can determine that the nth active contest of the N similar active contests is "saturated" if the nth active contest is equal to or above the predetermined threshold, and can determine that the nth active contest of the N similar active contests is "under-saturated" if the nth active contest is below the predetermined threshold. In some embodiments, the saturation status is a value (which can be positive or negative) based on a difference between the number registrants for the nth active contest at the time T and the predetermined threshold. The contest generator 304 can receive the saturation status of the nth active contest from the registrant projector 310.

The contest generator 304 can determine that the registration status is under-saturated and the process can proceed to BLOCK 858, at which the contest generator 304 can increment an under-saturation counter, and the process can proceed to BLOCK 860. The contest generator 304 can determine that the registration status is saturated, and the process can proceed to BLOCK 860. In some embodiments in which the saturation status is a value based on a difference between the number registrants for the nth active contest at the time T and the predetermined threshold, at BLOCK 856 the increment the counter based on the value (e.g. by the value), and the process can proceed to BLOCK 860.

At BLOCK 860, the contest generator 304 can determine whether the index is equal to the number N of active similar contests. The contest generator 304 can determine that the index is not equal to the number N of active similar contests, and the process can proceed to BLOCK 862, the contest generator 304 can increment the index n, and the process can proceed to BLOCK 856. The contest generator 304 can determine that the index is equal to the number N of active similar contests, and the process can proceed to BLOCK 864.

At BLOCK 864, the contest generator 304 can determine whether an under-saturation count of the under-saturation counter is above or equal to a predetermined threshold. The contest generator 304 can determine that the under-saturation count of the under-saturation counter is above or equal to the predetermined threshold, the process can proceed to BLOCK 866, and the contest generator 304 can restrict generation of the new contest. Restricting generation of the new contest can include determining not to generate the new contest and terminating the process for generating a new contest. Restricting generation of the new contest can include revising the schedule based on the determination to restrict generation of the new contest (e.g. rescheduling generation of the contest to a new time).

At BLOCK 864, the contest generator 304 can determine that the under-saturation count of the under-saturation counter is less than the predetermined threshold, the process can proceed to BLOCK 868, and the contest generator 304 can generate the new contest (e.g. based on the contest-generating parameters of the new contest).

The process depicted in FIG. 8B can provide for improved allocation of computing resources by restricting generation of contests based on a determination that one or more active contests are projected to be under-saturated, which may indicate that the active contests have capacity to accept many registrants and that generation of a new contest (and corresponding use of computing resources) is not necessary.

C. Systems and Methods for Algorithmically Arranging Contests in a Lobby Interface The following description relates to one or more systems and methods for algorithmically arranging contests in a lobby interface. A contest management system can generate, execute and maintain a plurality of contests, such as but not limited to, fantasy sports contests. The contest management system can assign rank values to the contests based in part on contest pacing parameters of the respective contests and profile attributes of a plurality of users who participate in the contests. Each of the contests can be a computer-based object that is generated and updated by the contest management system. Each contest can be configured with a maximum number of registrants and a registration deadline by which registrants can register for the contest. The contest can also maintain a count of the number of registrants that have registered to participate in the contest. Each contest can be associated with one or more pacing parameters or the content management system can use a contest pacing algorithm to determine one or more pacing parameters, such as registration ratios and a time remaining till the registration deadline which can be used to determine if a particular contest is on pace to meet a registration threshold prior to its respective registration deadline. For example, if a contest is under-saturated (e.g., does not have enough registrants by the registration deadline), the contest may be canceled or rescheduled. Furthermore, if a contest is not on pace to meet its registration goals, the contest management system can take proactive measures to promote the contest in an effort to increase the number of registrations before the registration deadline.

Thus, the contest management system as described here can use contest pacing information to identify contests that may be at risk of not meeting their respective registration threshold and also identify one or more users that have participated in similar contests in the past to the contests at risk of not meeting their respective registration threshold and are more likely to participate in the identified contests. The contest management system can identify user vectors linking the user profiles of these respective users and provide the contests to devices associated with the users, for example, as recommendations, to aid the respective contests in meeting their registration thresholds.

Figure 9:
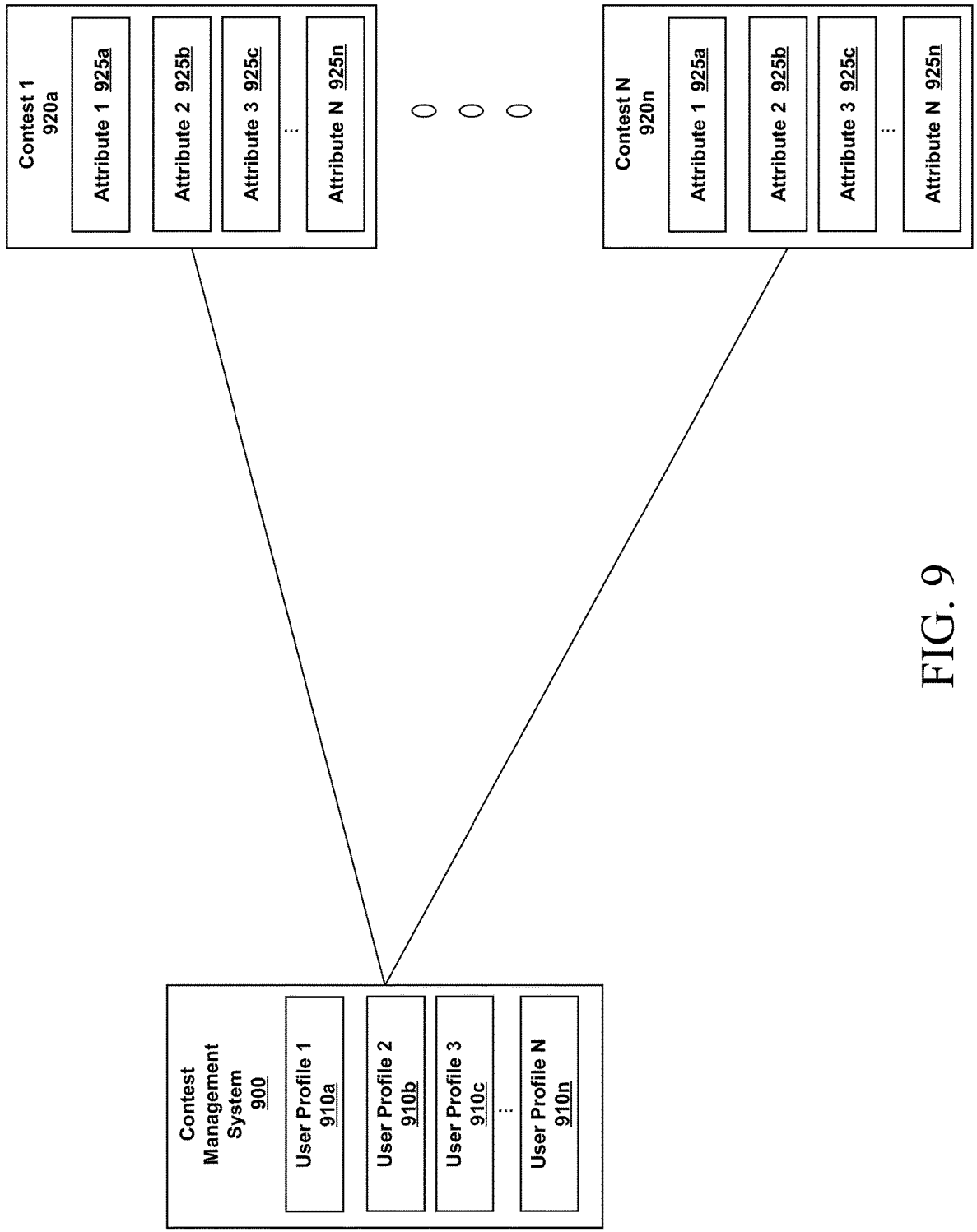
FIG. 9 depicts one or more embodiments of a contest managements system having a plurality of user profiles.

Now referring to FIG. 9, a contest management system 900 is shown maintaining a plurality of user profiles 910a-910n. The user profiles 910 can be associated with one or more users of contests generated and executed by the contest management system 900. The contest management system 900 can be the same as or substantially similar to the contest management system 206 of FIG. 1C. For example, the contest management system 900 can include contest ranking system 302 of FIG. 3. The contest management system 900 can identify or select one or more contests 920a-920n from a plurality of contests 920a-920n to be provided to a plurality of users.

Each of the contests 920a-920n can include contest attributes 925a-925n. For example, the contest attributes 925a-925n can be the same as or substantially similar to the contest attributes illustrated in lobby 202 of FIG. 2A and FIG. 2B. For example, the contest attributes 925a-925n can include a sport category, a contest name or identifier, a contest style, an entry fee, a total prize pool for the contest, a total number of entries and a maximum registrant cap (which may be a dynamic cap that increases or decreases over time, or increases or decreases based on other factors such as current registrant data and/or projected registrant data), and a time corresponding to a registration deadline (e.g. a countdown to the contest going "live," or a time of the registration deadline).

Other information (e.g. contest relevant information) may be displayed in place of, or in addition to, any of the contest attributes shown in FIGS. 2A-2B, such as but not limited to a registration ratio, a registrant threshold, a registrant limit, a current registrant count, a day value (e.g., day of week), a time value (e.g., time of day), a duration value an experience level (e.g., beginner, intermediate, expert), whether the contest is private versus public, and contest pacing parameters.

The contest management system 900 can identify one or more contests from the plurality of contests 920a-920n based in part on the contest attributes 925a-925n of the different contests 920a-920n and the contest pacing parameters to display, for example, one or more contests 920a-920n that are determined to be below pace more prominently than would otherwise be the case to a user.

For example, the contest management system 900 can identify one or more of the contest attributes 925a-925n to initiate a search for a contest 920 to be displayed to a user. In one embodiment, the contest management system 900 can use the total number of entries, the registration cap and registration deadline as content attributes 925a-925n to initiate the search. The contest management system 900 can determine registration ratio values for plurality of contests 920a-920n using the total number of entries and the registration cap. The contest management system 900 can identify a set of candidate contests from the plurality of contests 920a-920n having the registration ratio values greater (or less) than predetermined thresholds or within predetermined ranges. The thresholds can correspond to a contest pacing parameter used to determine if a contest is below pace and at risk of not meeting its respective registration target.

The contest management system 900 can algorithmically arrange the plurality of contests 920a-920n in a lobby interface (e.g., lobby 202 of FIGS. 2A-2B) based on contest pacing scores and rank values, as will be described in greater detail below with respect to FIG. 10. The contest pacing scores and the rank values can be generated using the contest attributes 925a-925n, such as but not limited to, the total number of registrants, registration cap, and registration deadline.

Now referring to FIG. 10, the contest management system 900 can include a contest database 940 that stores the plurality of contests 920a-920n and contest attributes 925a-925n. The contest database 940 can arrange and organize the contest data in a variety of different ways, for example and as depicted in FIG. 10, the plurality of contests 920a-920n are organized and ranked based on the contest attributes 925a-925n. The contest database 940 can correspond to the lobby 202 of FIGS. 2A-2B that is provided to a user.

The contests 920a-920n can include fantasy sports contests. The contests 920a-920n can be based at least in part on one or more sports leagues (e.g. NFL, MLB, NHL, NBA, a non-US league, or another sports organization), and/or a game type (e.g. classic (with salary constraints) or pick'em (without salary constraints)).

In the illustrative embodiment of FIG. 10, the contest attributes 925a-925n include sport 925a, contest type 925b, contest entry fee 925c, contest total prizes 925d, contest registrants 925e, a registration deadline 925f, contest pacing score 925g, and a contest rank score 925h. The number of attributes stored in the contest database 940 can vary. For example, one or more of the contest attributes described herein can be included within the contest database 940 for each of the contests 920a-920n.

The sport 925a can refer to a sport category of the particular contest, such as but not limited to football, basketball, baseball, or golf. The contest type 925b can refer to a type of contest, such as but not limited to classic style or pick'em style. Entry fee 925c can refer to a price parameter established that a user must pay to enter and/or register for the particular contest. Total prizes 925d can refer to the total amount of prize money available for a contest. The total prize money may include a prize for winning the respective contest or an amount of winnings to be divided based upon predetermined payout amounts for placing within a predetermined number of eligible spots in the respective contest.

The registrants 925e (e.g., registration ratio) can include the total number of users registered for the particular one of contests 920a-920n and a maximum registrant cap. In some embodiments, the registrants 925e can correspond to a registration ratio between the number of registrants currently registered for a particular contest versus the total number of registrants allowed to register for the particular contest (e.g., capacity limit). The registration deadline 925f can refer to a deadline when the registration closes or a date as to when the contest management system needs to decide whether to cancel the contest or more forward with the contest. The registration deadline 925f can include a predetermined time period which indicates a time window (e.g., 22 minutes, 1 hour, 2 hours from deadline) when a decision should be regarding whether to cancel a contest or more forward with a contest. For example, if the registration ratio for a contest hasn't reached a registration threshold (e.g., registration ratio is less than the registration threshold), the contest management may cancel the respective contest. The registration threshold may refer to a threshold that indicates if a contest in on pace or if a contest will be profitable based on the number of users entered or a minimum number of registrants needed to hold a contest.

The contest pacing score 925g can indicate if a particular contest has met its respective registration threshold, is on target to meet its respective registration target or is at risk of not meeting its respective registration target. For example, in some embodiments, a higher contest pacing score 925g may indicate that a particular contest has met its respective registration threshold, a lower contest pacing score 925g may indicate that a particular contest is at risk of not meeting its respective registration threshold, and a middle contest pacing score 925g or a contest pacing score 925g between a lower value and a higher value may indicate that a particular contest has not met its respective registration threshold but is on target to meet the registration threshold by the registration deadline.

As described above with respect to FIG. 3, the contest pacing scores 925g can be computed by the pace tracker 312. The pace tracker 312 can determine a projected or desired number of registrants for a target contest at a particular time (e.g. a particular time relative to opening of registration or close of registration). The projected or desired number of registrants can be determined based on registrant data or a registrant profile for one or more contests similar to the target contest. The projected or desired number of registrants can be determined based on registrant-profile parameters determined for the target contest by the registrant projector 310.

The pace tracker 312 can determine a difference between a number of registrants for the target contest at a point in time (e.g. a current number of registrants) and the projected or desired number of registrants for the point in time. In this manner, the pace tracker 312 can determine if the target contest is below pace or above pace, and to what degree the target contest is below pace or above pace. The contest generator 304 can use this determination to determine a timing for generating a new contest. For example, if the target contest is below pace, the contest generator 304 may delay or restrict generating a new contest as described above. One or more embodiments of methods of using the pace tracker 312 are described herein with reference to FIG. 7A and FIG. 7B.

The pace tracker 312 can further rank contests based on respective pace statuses. For example, the pace tracker 312 can determine, for each contest of a plurality of contests, to what degree the contest is under-saturated or below pace (e.g. by how many participants the contest is below pace, or by a percentage difference between an "on pace" number of participants (e.g. the projected or desired number of participants) and the projected pace, either at the current time or at a future time (e.g. at close of registration)). The pace tracker 312 can determine a rank for each of the plurality of contests (or for a sub-set of the plurality of contests having being under-saturated or below pace to a degree that is equal to or greater than a threshold) based on the pace statuses. The pace tracker 312 can determine a high rank for a contests that is most under-saturated or below pace. The rank value 925h can be assigned to contests 920a-920n based on the pace status of a respective contest, the contest criteria, and/or profile attributes or a combination of the contest pacing scores 925g, contest criteria, and/or profile attributes. For example, using a ranking algorithm, the contest management system 900 can determine a rank value 925h for each of the plurality of contests 920a-920n (or for a sub-set of the plurality of contests having being under-saturated or below pace to a degree that is equal to or greater than a threshold) based in part on the contest pacing scores 925g. In one embodiment, the contest management system 900 can determine a high rank value 925h for one or more contests that are at risk of not reaching their respective registration threshold (e.g., most under-saturated or below pace) and a low rank value 925h for one or more contests that have hit their respective registration threshold or are within a predetermined percentage of their respective registration threshold.

The contest management system 900 can use the contest pacing scores 925g and rank values 925h to display more prominently one or more of contests 920a-920n that are below pace. For example, the contest management system 900 can display the contests that are below pace in a predetermined location (e.g. in a prominent position in the lobby, such as at the top or start of a list of contests), or can display the contest according to one or more features, such as a stylistic feature (e.g. a particular text style (which can specify a size, a font, underlining, bold, italics, or another style, and in some embodiments the style is different than the another style used in the lobby), a visual indicator associated with the reference to the similar contest (e.g. a box, circle, or other visual indicator that surrounds or is otherwise positioned relative to the reference), or any other appropriate feature.

Figure 11:
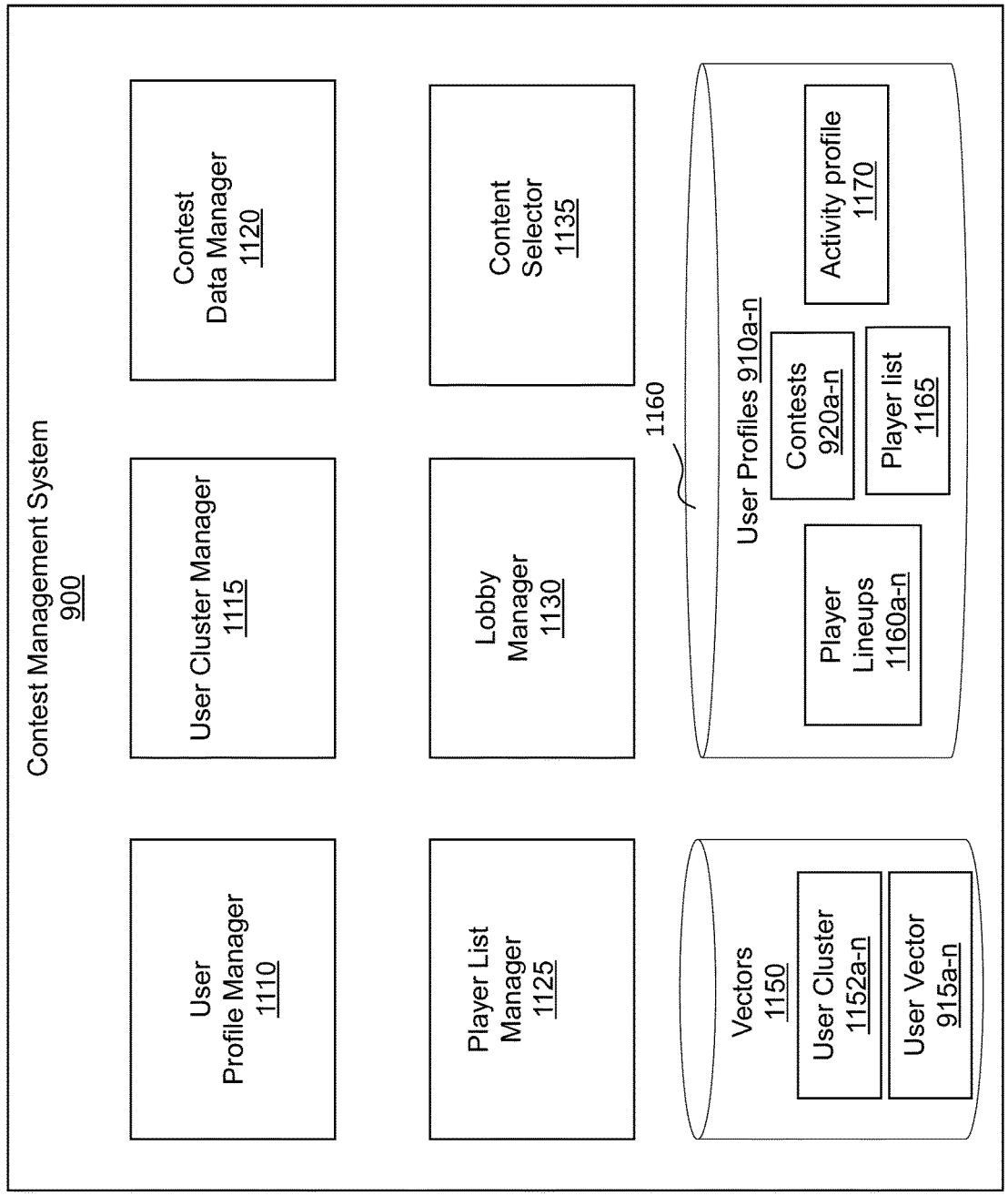
FIG. 11 depicts one or more embodiments of a block diagram of a contest management system.

Now referring to FIG. 11, a block diagram depicting an embodiment of the contest management system 900 is shown. The contest management system 900 can include or be executed on one or more servers, such as the servers 106 shown in FIG. 1A. The contest management system 900 can be the same as or substantially similar to the content management system 206 of FIG. 1C. The contest management system 900 can include one or more user profile manager 1110, user cluster manager 1115, contest data manager 1120, a player list manager 1125, a lobby manager 1130, and a content selector 1135. The contest management system 900 can also include, access, maintain or manage one or more data structures, including but not limited to a vectors data structure 1150, and a user profiles data structure 1160. The vectors data structure 1150 can store one or more user clusters 1152 and one or more user vectors 915a-n. The user profiles data structure 1160 can store one or more user profiles 910a-n corresponding to users of the fantasy sports platform. The user profiles 910a-n can include player lineups 1160a-n generated for one or more contests 920a-n in which the user submitted a player lineup 1160 and an activity profile 1170 of the user including information relating to usage of the application executing on a client device as well as other information obtained by the fantasy sports platform via interactions with the user through application, browser, or other data sources to which the fantasy sports platform has access.

The user profile manager 1110 can comprise components, subsystems, modules, scripts or one or more sets of computer-executable instructions and can be configured to identify and store user profiles 910a-n created, registered and/or used to enter one or more contests. The user profile manager 1110 can manage completed user profiles and incomplete user profiles (e.g., user profiles missing data). The user profile manager 1110 can generate user profiles, such as the user profile 910a. The user profile manager 1110 can access, from a plurality of databases and other data sources, one or more attributes associated with one or more players included in player lineups 1160 generated by the user and included in the user profile 910a. In addition, the user profile manager 1110 can access, from a plurality of databases and other data sources, one or more attributes associated with one or more contests 920a-n for which the user submitted one or more player lineups 1160. The user profile manager can also use activity information from an activity profile 1170 that can include any information accessible to the user profile manager 1110 that the user has provided or otherwise helped the contest management system 900 generate or otherwise acquire.

The user profile manager 1110 can be configured to generate a user vector for each user profile 910 based on the lineups 1160, contests 920 and activity profile 1170 associated with the user profile 910. The user vector can include multiple features. Each feature can include a feature value providing an indication of a strength of a particular feature based on the user's profile 910. The user profile manager 1110 can generate one or more features for a user vector based on player attributes of the players 1612 include in each player lineup 1160.

The contest data manager 1120 can comprise components, subsystems, modules, scripts or one or more sets of computer-executable instructions and can be configured to store data corresponding to one or more contests, including but not limited to, contest attributes. The contest data manager 1120 can include a sport category, a price parameter, a prize parameter, a registrant threshold, a registrant limit, a current registrant count, a day value, a time value, a duration value, a contest type, and an experience level required for a particular contest. The contest data 920 may include data corresponding to previous contests, active contests or future contests.

The player list manager 1125 can comprise components, subsystems, modules, scripts or one or more sets of computer-executable instructions and can be configured to manage player lists 1165 for users of the contest management system 900. The player list manager 1125 can be configured to access accounts of users and/or the user profiles 910 of the contest management system 900. In some embodiments, the accounts of users can be linked to the user profiles 910.

The player list manager 1125 is configured to maintain, for each user, one or more player lineups 1160. The player lineups 1160 can include a list of all of the players that the user has selected in one or more lineups for one or more contests. The player list manager 1125 can be configured to receive updates and modifications to the player lineups 1160 including statistics about each player included in the player lineups 1160. In addition, the player list manager 1125 can include information about a value assigned to each player as well as a number of fantasy points assigned to each player based on the player's in-game performance.

In some embodiments, the player list manager 1125 can be configured to establish a web socket connection with one or more servers of one or more fantasy sports systems and be configured to receive activity updates of the users. In some embodiments, the contest management system 900 may identify a user's account at the fantasy sports system and link the respective accounts of the user. As described herein, the contest management system 900 can include or be part of a content management system or the fantasy sports platform, and as such, may be configured to receive and access data generated by or otherwise accessible to the content management system or the fantasy sports platform. In this way, lineup changes, additions, or deletions made in an account of a user of the fantasy sports system can be provided to the contest management system 900, thereby allowing the contest management system 900, or the player list manager 1125, to update the player lineups 1160a-n of user profiles 910.

The player list manager 1125 can be configured to receive, for a user of the contest management system 900, from a fantasy sports system, a communication identifying a fantasy lineup and an account of the user maintained by the fantasy sports system. The player list manager 1125 can use the account of the user maintained by the fantasy sports system to identify the corresponding account of the user maintained by the contest management system 900 to which the account of the user of the fantasy sports system is linked. The player list manager 1125 can then retrieve player lineups 1160a-n associated with the account of the user maintained by the contest management system 900 and identify each of the players included in the respective player lineups 1160a-n and maintain a count of the number of times a particular player has been selected or included in the player lineups 1160a-n. In some embodiments, the player list manager 1125 can maintain a player list 1165 that includes each of the players included in the player lineups 1160a-n.

In some embodiments, the player list manager 1125 can maintain, for each player in the player list 1165, a number of lineups of the user in which the player is included. The player list manager 1125 can also maintain, for each player in the player list 1165, an expiration condition according to which the player will be removed from the player list 1165. For instance, the player is removed from the player list when the player is no longer included in any fantasy lineup of the user for contests that are ongoing or are scheduled for the future. As such, the player list manager 1125 can remove the player from the player list 1165 once the expiration condition is satisfied. In some embodiments, the expiration condition is satisfied when all of the sporting events of a particular fantasy contest have ended. In some embodiments, the expiration condition is satisfied when all of the sporting events of a particular fantasy contest have begun. In some embodiments, the player list manager 1125 can receive score updates from one or more content servers and use the score updates to determine when sporting events end. In this way, the player list manager 1125 maintains a list of players that are relevant to a user in that the players are part of lineups 1160 submitted for contests having one or more sporting events that have yet to be completed. In some embodiments, players may be removed from a player list after a certain amount of time (for example, 1 week, 1 month, 1 year, etc.) has passed since the player was included in a player lineup 1160 that was entered into a contest.

Although the player list manager 1125 as described herein may receive a list of players associated with a user from the fantasy sports system, the player list manager 1125 can be configured to receive the list of players from the client device of the user. In some embodiments the player list manager 1125 can be configured to determine the list of players from the request for content received from the user. In some embodiments, the request for content can include the list of players that the user is interested in, which can be based on players that are included in one or more fantasy lineups 1160. In some embodiments, the request for content generated by the client device or the application executing on the client device can include the list of players responsive to determining that a configuration setting for filtering content based on the players included in one or more fantasy lineups 1160 of the user. In some embodiments, the request for content can include a flag or other indicator indicating that the status of the configuration setting for filtering the content. For instance, the flag can be set to a first value if the configuration setting is enabled and the flag can be set to a second value if the configuration setting is disabled.

Referring again to the user profile manager 1110, the user profile manager 1110 can be configured to generate the user vector of a user profile based on input from the contest data manager 1120 and the player list manager 1125. The user profile manager 1110 can generate the multidimensional vector based on the players selected by the user in one or more lineups 1160 as well as the contests for which the user has registered. The multidimensional vector can apply weights to different features or values of features based on additional information relating to the user, for instance, a user's geographical location, a user's declared interests, one or more inferred interests or preferences of the user, among others. Furthermore, the user profile manager 1110 can import information from other users to further enhance a user's multidimensional vector 915. For instance, the user cluster manager 1115 can identify one or more users that are similar to the user based on their respective multidimensional user vectors and can determine information common across some or many users in the cluster of users that the user profile manager 1110 may import into the user. For instance, if users in the cluster of users prefer a certain player or players having a certain attribute, the user profile manager 1110 may adjust the multidimensional vector of the user to indicate that the user also prefers the certain player or players having the certain attribute.

The lobby manager 1130 can comprise components, subsystems, modules, scripts or one or more sets of computer-executable instructions and can be configured to manage one or more lobbies that can be provided to one or more users. The lobby manage 1130 can include, generate, and manage lobby 202 of FIGS. 2A-2B. For example, a lobby, such as but not limited to lobby 202 of FIGS. 2A-2B, is a data structure that can include one or more contests arranged according to a particular order and can be provided to a device to enable a user to select a contest from the lobby. The lobby may display contests that are determined to be below pace more prominently than other contests that are at or above pace. The pace can be determined using pacing parameters or contest pacing scores generated by the contest management system 900 or the lobby manager 1130.

For example, the user can select a contest to enter the contest or to learn more about the contests. The lobby manager 1130 can be configured to generate a lobby including one or more contests responsive to the user action. The lobby can include one or more active contests that are currently in progress, one or more future contests for which registration is still open, and one or more past contests for which the contests have already ended. The contests can be displayed based in part on their respective pacing parameters. Thus, contests that are below pace can be displayed first or otherwise before contests that are on pace or ahead of pace.

The lobby manager 1130 can be configured to generate a lobby that can be transmitted to a plurality of users or can generate a personalized lobby based on the user vector of a given user. Additional details regarding the lobby manager 1130 are described below.

The content selector 1135 can comprise components, subsystems, modules, scripts or one or more sets of computer-executable instructions and can be configured to select content to transmit to devices of users associated with user profiles maintained by the contest management system 900. The content selector 1135 can be configured to transmit content items responsive to the contest management system 900 or the content management system 206 receiving requests from applications executing on such devices of users.

The content selector 1135 can be configured to determine the type of content items to transmit to the application executing on a device of a user responsive to the request received from the application as well as based on state information associated with the application at the time the request was transmitted. The state information associated with the application at the time the request was transmitted can be determined by establishing a persistent connection, such as a web socket connection with the application to determine which page of the application the user is on, one or more configuration settings set on the application, among others. The content selector 1135 can determine, from the request or the state information, the type of content to transmit to the client device on which the application is executing.

The content selector 1135 can identify, from a plurality of content items accessible to the contest management system 900, a subset of content items to transmit to the application. In some embodiments, the content selector 1135 can maintain a queue of content items to transmit to the application. The content items can be selected using the user vector associated with the user. In some embodiments, the queue of content items can be ordered in accordance to chronological order or reverse chronological order. For instance, the content items can be ordered based on a timestamp of the content item such that the content item that the content management system most recently received is placed at the top of the queue of content items. The content selector 1135 can be configured to rearrange the content items included in the queue of content items as the user adjusts one or more content filtering parameters on the application. The content selector 1135 can prioritize one or more content items over other content items included in the queue of content items. The content filtering parameters can include parameters that affect which content is selected by the content selector 1135 for transmission and/or display to the client device. The content filtering parameters may change as the user navigates to different pages on the application or as the user changes the type of content items the user would like to view in the content feed.

The content selector 1135 can be configured to assign a priority score to each content item included in the queue. The priority score can be determined based on the tags associated with the content item. The priority score can be determined based on the tags associated with the content item and based on the players included in the player list of the user maintained by the player list manager 1125. As players are removed from the player list manager, the priority score of content items having player tags associated with such players can be decreased. Conversely, as players are added to the player list manager, the priority score of content items having player tags associated with players that have been added can be increased. In some embodiments, the content selector 1135, or the contest management system 900, may transmit content items based on the priority scores of the content items. Stated in another way, the content selector 1135, or the contest management system 900, may transmit content items that relate to players included in the player list before transmitting content items that relate to players not included in the list.

In some embodiments, the content selector 1135 can be configured to send all of the content identified or accepted by the contest management system 900. The content selector 1135 may send the content with one or more tags assigned by the content labeler. The content selector 1135 can be configured to communicate with the application executing on the client device to transmit all of the content items to the client device.

The vector data structure 1150 is a data structure that can store one or more user clusters 1152 and one or more user vectors 915*a-n*. The vector data structure can be maintained by the contest management system 900. In some embodiments, the vector data structure 1150 can be stored on a server of the contest management system 900 or can be accessed by the contest management system.

In some embodiments, the contest management system 900 can be configured to modify the user clusters 1152 or user vectors 915*a-n*. In some embodiments, as new user vectors 915 are generated, the user vectors can be assigned to one or more user clusters 1152 based on a similarity between the user vector and the user clusters 1152. In addition, the contest management system can assign one or more tags to each user vector and/or user cluster based on attributes of the user vector or user cluster. These tags can be based on a weight of a particular attribute. For instance, if a user vector includes a lot of players that play football but no players that play basketball, the contest management system 900 can assign a football tag to the user vector. These tags can be used by various modules of the contest management system 900 for selecting content, for arranging lobbies, or for identifying similar users.

The contest management system 900 can include or execute a ranking algorithm, to filter, rank, and organize contests and contests data for presentation to a user, such as for display in a lobby (e.g., lobby 202 of FIGS. 2A-2B). The contest management system 900, using a ranking algorithm, can be configured to assign frequency values, importance values, rank values, and/or weights to contests, contest attributes, and player attributes. The contest management system 900 can use the ranking algorithm to determine what contests are below pace and thus, rank them ahead of contests that are on pace or ahead of pace.

Figure 12A:
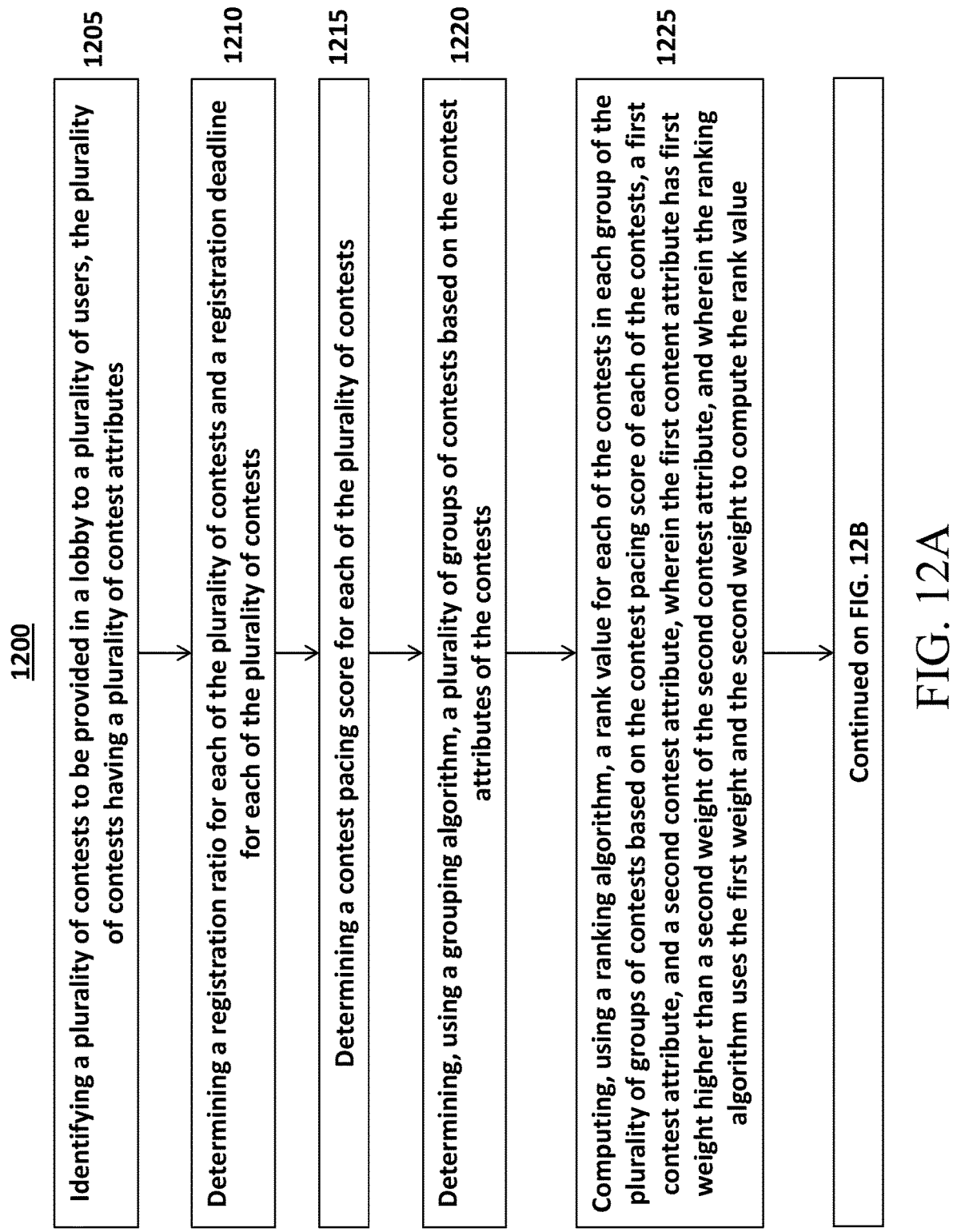
FIGS. 12A-12B shows a flow diagram of a method for systems and methods for algorithmically arranging contests in a lobby interface.
Figure 12B:
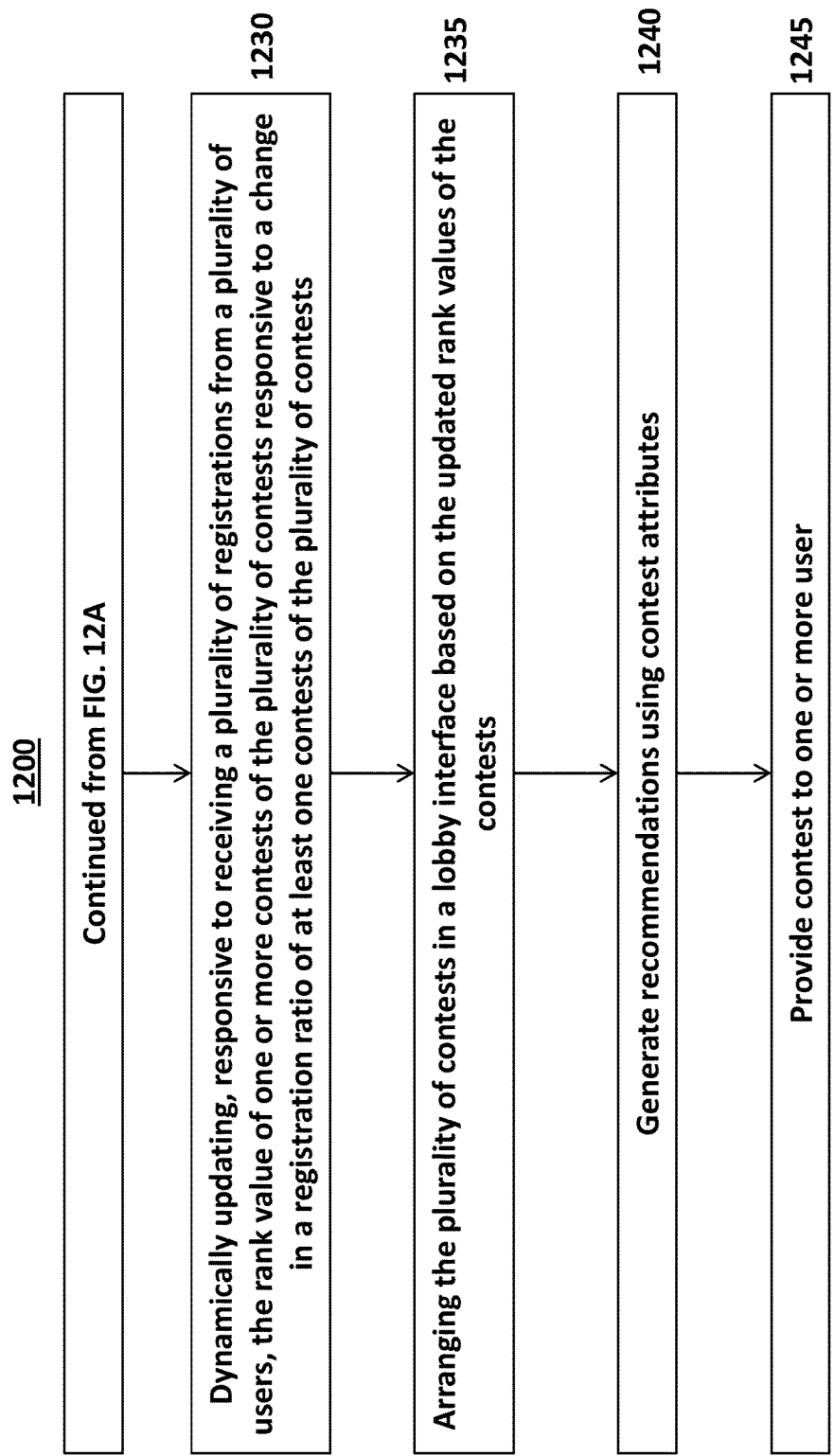

Now referring to FIGS. 12A-12B, a method 1200 for algorithmically arranging contests in a lobby interface based on contest pacing begins at block 1205, by identifying a plurality of contests 920 to be provided to a plurality of users and/or user profiles 910. The contests 920 can be selected based in part on contest attributes 925 of the contests 920. A contest management system 900, such as contest management system 900 of FIGS. 9-11, can include one or more processors and be configured to generate and/or identify contests 920 for a plurality of users.

The contest management system 900 can include a system for generating, hosting and maintaining fantasy sports contests or betting contests (e.g., contest management system 206, contest management system 900). Contests 920 as used and described herein can include fantasy sports contests (e.g., fantasy football, fantasy baseball, etc.) and/or betting contests. The contest management system 900 can include a plurality of user profiles 910 associated with users who plan on participating in a contest 920 in the future, are currently participating in a contest 920 and/or have already participated in a contest 920. For example, when a user initially enters a contest 920, the user can register and create a user profile 910 or the contest management system 900 can create a user profile 910 for the respective user. The contest management system 900 can maintain the plurality of user profiles 910 and generate and provide content to devices associated with the plurality of user profiles 910.

Contests 920 can be identified for the plurality of user profiles 910 based in part on the profile attributes of the user profiles and/or contests attributes 925 of the respective contests 920. For example, each of the contests 920 can include contest attributes 925 that the contest management system 900 can extract, review and use to determine which contests 920 should be provided the plurality of users. The contest attributes 925 can include one or more of the following: a sport category, a price parameter, a prize parameter, a registrant threshold, a registrant limit, a current registrant count, a registration ratio, a registration deadline, a pacing value, a rank value, a contest type, and an experience level.

In some embodiments, the content management system 900 can generate contests 920 for the user profiles 910 based in part on profile attributes of the users. For example, the profile attributes can include one or more of the following: a history of past contests, a plurality of lineups 1160, a user type, a location, an activity profile 1170 and price parameters. In some embodiments, the user profiles 910 can include one or more lineups 1160 (e.g., player lineups 1160) and the lineups 1160 can include player attributes, such as but not limited to one or more of the following: a name, a sport category, a location, a team value, a position value, a price parameter or one or more future contests specific to the respective player.

At block 1210, a registration ratio 925*e* and a registration deadline 925*g* for each of the plurality of contests can be determined. The registration ratio 925*e* can be a ratio between the number of registrants currently registered for a particular contest 920 versus the total number of registrants allowed to register for the particular contest (e.g., capacity limit). The registration deadline 925*f* can refer to a deadline when the registration closes or a date as to when the contest management system 900 needs to decide whether to cancel the contest 920 or more forward with the contest 920. The registration deadline 925*f* can include a predetermined time period which indicates a time window when a decision should be regarding whether to cancel a contest 920 or more forward with a contest 920. For example, if the registration ratio 925e for a contest 150 hasn't reached a registration threshold (e.g., registration ratio is less than the registration threshold), the contest management system 900 may cancel the respective contest 920. The registration threshold may refer to a threshold that indicates if a contest 920 will be profitable based on the number of users entered or a minimum number of registrants needed to hold a contest 920.

The contest management system 900 can extract contest data from a contest database (e.g., contest database 940 of FIG. 10) that stores the contest attributes 925 and data associated with each of the contests 920 generated, maintained and conducted by the contest management system 900. For example, the registrant data can be extracted and analyzed to determine the registration ratios 925e for each of the contests 920 and the registration deadlines 925f for each of the contests 920. The registration ratios 925e can be compared to respective registration thresholds established by the contest management system 900. In some embodiments, the registration thresholds can be the same for one or more of the contests 920 or the respective registration thresholds can be different for one or more of the contests 920.

At block 1215, a contest pacing score 925g for each of the plurality of contests 920 can be determined. The contest management system 900 can use a contest pacing algorithm to determine the contest pacing scores 925g (or values) for each of the plurality of contests 920 based on the registration ratios 925e, registration deadlines 925f or predetermined contest criteria. For example, the contest pacing algorithm can use registration data such as current registrant count, the registration ratios 925e, registration thresholds and registration deadlines 925f to determine if a particular contest 920 is on target to meet its respective registration threshold by the respective registration deadline 925f.

The contest pacing scores 925g can indicate if a particular contest 920 has met its respective registration threshold, is on target to meet its respective registration target or is at risk of not meeting its respective registration target. For example, in some embodiments, a higher contest pacing score 925g may indicate that a particular contest 920 has met its respective registration threshold, a lower contest pacing score 925g may indicate that a particular contest 920 is at risk of not meeting its respective registration threshold, and a middle contest pacing score 925g or a contest pacing score 925g between a lower score and a higher score may indicate that a particular contest 920 has not met its respective registration threshold but is on target to meet the registration threshold by the registration deadline 925f. For example, the contest management system 900 may include a pace tracker configured to monitor the pacing of one or more contests 920 (e.g. based on respective total numbers of registrants for the contests, registration ratio, registration threshold, and/or registration deadline). The pace tracker can be configured to generate an alert if one or more contests 920 are at risk of not meeting their respective registration threshold.

The contest management system 900 can be configured to determine a time at which to generate a contest 920 based on a pacing determined by the pace tracker (e.g. a pacing of one or more active contests) or a time at which to conduct a generated contest 920 based on the pacing determined by the pace tracker. In some embodiments, the contest management system 900 can be configured to deviate from a schedule (e.g. to delay generation of a scheduled contest, to restrict generation of a scheduled contest, or cancel a scheduled contest) based on a pacing determined by the pace tracker.

The contest management system 900 can determine the timing for generating a new contest 920 based on features and contest pacing scores 925g of one or more other contests 920. For example, the contest management system 900 can use the contest pacing algorithm to weigh the pacing information and features of the one or more contests 920 (e.g. based on respective total numbers of registrants for the contests 920, and/or based on respective registrant caps for the contests) and determine a timing for a different contest based on the pacing information of the one or more other contests 920. For example, the pace tracker may determine that one or more active contests 920 are under-saturated (e.g. registration ratio is less than the registration threshold, are below a projected or desired pace for the active contest 920, or below a projected or desired number of registrants). The contest management system 900 can be configured such that, based on or responsive to this determination, the contest management system 900 restricts generation of a scheduled contest 920 or activation of a scheduled contest 920.

In some embodiments, the contest management system 900 can generate new contests 920 based on the pacing of contests or contest pacing scores 925g that are currently open for registration. In this manner, the contest management system 900 can avoid or can delay generating new contests 920 and thus avoid the registrant dispersion issues discussed herein. Rather than maintaining a large number of contests 920 with few registrants, which requires a significant use of resources, the contest management system 900 can help to ensure that fewer contests with more registrants are generated, thus improving the efficiency of the allocation of computer resources for the contest management system 900.

The contest management system 900 can use the contest pacing algorithm and a ranking algorithm in combination to select and rank one or more contests 920. For example, in some embodiments, the contest management system 900 can select, using the contest pacing algorithm, one or more contests 920 based in part on their contest pacing scores 925g for presentation to users of the contest management system 900. The contest management system 900, using the ranking algorithm, can rank the selected one or more contests 920 based in part on a difference between their respective registration ratio 925e and the registration threshold. The contest management system 900 can use the contest pacing algorithm and the ranking algorithm to determine the layout for the contest display, such as in a lobby (e.g., lobby 202 of FIGS. 2A-2B). Thus, a contest 920 that is determined to be below pace may be displayed more prominently than other contests 920 that are on pace or ahead of pace.

At block 1220, the system can determine, using a grouping algorithm, a plurality of groups of contests 920 based on the contest attributes 925 of the contests 920. The contests 920 can be grouped using their respective contest attributes 925. For example, contests 920 can be grouped by sport. In some embodiments, the contests 920 can be grouped based on contest pacing scores 925g and rank values 925h. The contest attributes 925 can include one or more of the following: a sport category, a price parameter, a prize parameter, a registrant threshold, a registrant limit, a current registrant count, a registration ratio, a registration deadline, a pacing value, a rank value, a contest type, and an experience level.

The contest management system 900 can group contests 920 using one or more of the contest attributes 925 and using a grouping algorithm that can group contests in tiers. The grouping algorithm can identify multiple contest attributes 925 and then assign the different contest attributes 925 to different tiers to filter and group the contests 920. For example, the grouping algorithm can select sport category 925a and assign sport category 925a in the first tier. Next, the grouping algorithm can select contest type 925b and assign contest type 925b in the second tier. Then, the grouping algorithm can select registration ratio 925e and assign registration ratio 925e in the third tier. Using the sport category 925a, contest type 925b, and registration ratio 925e as contest attributes 925, the grouping algorithm can filter and sort the plurality of contests 920. For example, and in this example embodiment, the grouping algorithm can first sort the plurality of contests 920 by sport category 925a (e.g., football, basketball, baseball, soccer, etc.). Second, the grouping algorithm can sort the contests 920 already grouped by sport category 925a, using contest type 925b. Contest type 925b may include, but not limited to, pick'em contest, classic style, or tournament style. Third, the grouping algorithm can sort the contests 920 already grouped by sport category 925a and contest type 925b, by contest pacing scores 925g. For example, the contests 920 having lower contest pacing scores 925g or contest pacing scores 925g within a first range can be grouped together, the contests 920 having pacing within a second range can be grouped together, and the contests 920 having contest pacing scores 925g within a third range can be grouped together. In this example embodiment, the grouping algorithm can then generate groups of contests 920 having similar or common sports category 925a, similar or common contest types 925b, and common or similar registration ratios 925e. As described herein, the grouping algorithm that groups contests 920 according to a hierarchy where different contest attributes 925 are at different hierarchical levels. It should be appreciated that the grouping algorithm can use any number of contest attributes 925 to group the contests 920 (e.g., one contest attribute, more than one contest attribute) and any number of tiers to group the contests 920 (e.g., one tier, more than one tier).

At block 1225, using a ranking algorithm, for each contest 920 in a first group of the plurality of groups, a rank value 925h can be computed for the contest 920 based on the contest pacing score 925g of the contest 920, a first contest attribute 925 of the contest 920, and a second contest attribute 925 of the contest 920. In embodiments, the first contest attribute 925 can have a first weight that is greater than a second weight of the second contest attribute 925. The ranking algorithm can use the first weight and the second weight to compute the rank value 925h. The contest management system 900 can generate and/or assign a rank value 925h to one or more contests 920 of the plurality of contests 920 in each group of the plurality of groups based on the contest pacing scores 925g, a first contest attribute 1552, and a second contest attribute 925. The contest management system 900 can be configured, using the ranking algorithm, to determine rank values 925h for each contest 920 f the plurality of contests 920 and assign the rank values 925h to each of the plurality of contests 920.

The contest management system 900 can assign rank values 925h to contests 920 based on the contest pacing scores 925g or pace status of a respective contest 920, the contest criteria, and/or profile attributes 925 of the respective contest 920 or a combination of the contest pacing scores, contest criteria, and/or profile attributes. For example, using the ranking algorithm, the contest management system 900 can determine a rank value 925h for each of the plurality of contests 920 (or for a sub-set of the plurality of contests having being under-saturated or below pace to a degree that is equal to or greater than a threshold) based in part on the contest pacing scores 925g. In one embodiment, the contest management system 900 can determine a high rank value 925h for one or more contests 920 that are at risk of not reaching their respective registration threshold (e.g., most under-saturated or below pace) and a low rank value 925h for one or more contests 920 that have hit their respective registration threshold or are within a predetermined percentage of their respective registration threshold.

The contest management system 900 can use contest criteria to assign weight values to one or more contest attributes 925. For example, the predetermined contest criteria (or more simply contest criteria) can refer to a weighting algorithm applied to the contest attributes 925 to determine which attributes 925 should be weighted higher or lower than other contest attributes 925 included in the contest database 940. The weight algorithm can select and assign weight values based in part on the tier rankings applied by the grouping algorithm, based in part on the contest attributes 925 of the groups of contests 920, and/or based in part on profile attributes of one or more user profiles 910. The weight values can be used to identify contests 920 that should be targeted to a particular group, cluster of user profiles 910, for example, using the profile attributes corresponding to the particular group, cluster of vector or user profiles 910. In some embodiments, the registration ratio 925e can be assigned a highest weight value and/or the registration deadline 925f can be assigned a highest weight value. The weight values can vary and can be selected based in part on parameters of a group of contests 920, a particular contest 920 and/or a group of user profiles 910 to be targeted with the respective contest 920.

In some embodiments, the contest management system 900 can assign rank values based in part on whether one or more of the plurality of contests 920 are "similar" to contests 920 that user profiles in a cluster of users have participated in or are registered for. The contest management system 900 can extract profile attributes from the user profiles 910 to identify "similar" contests 920 that that user profiles 910 in the cluster of users have participated in or are registered for. In some embodiments, the contest management system 900 can extract the features from the group vector to identify the "similar" contests 920. The ranking algorithm can be used to determine similar a particular contest is, relative to other similar contests. A contest 920 may also be ranked, along with other similar contests 920 of the plurality of contests, based on their similarity to contests 920 included in a user's history of one or more user profiles 910 in the cluster of users.

At block 1230, the contest management system 900 can update the rank value of at least the first contest 920 responsive to a change in a registration ratio 925e of the first contest 920 of the plurality of contests 920. For example, the contest management system 900 can receive a new or subsequent registration for the first contest 920 that changes the registration ratio 925e of the first contest 920. The new or subsequent registration can move the first contest 920 closer to its respective registration threshold. In some embodiments, the new or subsequent registration can move the first contest 920 over, past or equal to its respective registration threshold. The contest management system 900 can update or change the registration ratio 925e of the first contest 920. The contest management system 900 can update or change the rank value 925h of the first contest 920.

In embodiments, the contest management system 900 can dynamically update, responsive to receiving a plurality of registrations from a plurality of users, the rank value 925h of one or more contests 920 of the plurality of contests 920 responsive to a change in a registration ratio 925e of at least one contests 920 of the plurality of contests 920. The contest management system 900 can be configured to dynamically and continuously update the rank values 925$e$ of contests 920 as new the different contest attributes 925 (e.g., registration ratio 925$e$) of the contests 920 change. For example, as the contest management system 900 receives new requests or registrations for contests 920, the registration ratios 925$e$ of the respective contests 920 can be updated or changed.

For example, the first contest 920 can receive multiple new requests for users or multiple users can register for the first contest 920. Thus, the registration ratio 925$e$ of the first contest 920 can be modified to reflect the new users registered. The new registration ratio 925$e$ may put the first contest 920 over its respective registration threshold or change its contest pacing score 925$g$ such that the first contest 920 is now on pace to hit its respective registration threshold. The contest management system 900 can, responsive to these changes, update the rank value 925$h$ of the first contest 920. The update of the rank value 925$h$ can cause the first contest 920 to be ranked lower or ranked higher with respect to other contests 920 or other contests 920 grouped with the first contest 920. In some embodiments, the updated rank value 925$h$ may cause the grouping algorithm to change or modify the contest group the first contest 920 is in and thus, the first contest 920 can be selected for a different contest group. The contest management system 900 can be configured to dynamically and continuously update the rank values 925$h$ of contests 920 as one or more of the contest attributes 925 of any of the contests 920 in the plurality of contests 920 are changed or modified.

At block 1235, the contest management system 900 can arrange the plurality of contests 920 in a lobby interface based on the updated rank values 925$h$ of the contests 920. The rank value 925$h$ can correspond to a contest pacing score 925$g$ for the respective contest 920. Thus, the contest management system 900 can arrange the contests 920 in a lobby (e.g., lobby 202 of FIGS. 2A-2B) such that contests 920 that are below pace or have a lower rank value 925$h$, as compared to other contests 920, can be displayed more prominently than the other contests 920. The contest management system 900 can arrange the contests 920 having the lowest rank values in a predetermined location (e.g. in a prominent position in the lobby, such as at the top or start of a list of contests). In some embodiments, the contest management system 900 can use features, such as but not limited to, a stylistic feature (e.g. a particular text style (which can specify a size, a font, underlining, bold, italics, or another style, and in some embodiments the style is different than the another style used in the lobby), a visual indicator associated with the reference to the similar contest (e.g. a box, circle, or other visual indicator that surrounds or is otherwise positioned relative to the reference), or any other appropriate feature to display the respective contests having the lower rank values more prominently in a lobby.

At block 1240, the contest management system 900 can generate recommendations for one or more user profiles 910 in the cluster of users based in part one or more contest attributes 925. For example, the contest management system 900 can generate recommendations for one or more user profiles 910 in the cluster of users based on contests 920 being under saturated (e.g., having a registration ratio 925$e$ that is less than their respective registration threshold). By incorporating the under-saturation factors into the rank values 925$h$, the contest management system 900 can generate, transmit or request content items that recommend the under-saturated contests to one or more user profiles in the cluster of users, with the under-saturated contests being "similar" to the user profile of the respective user. The contest management system 900 can generate contest recommendations for a cluster of users from the plurality of contests 920 using the contests rank values 925$h$ and a difference between their respective registration ratios 925$e$ and registration thresholds. The contest management system 900 can provide the recommendations to the cluster of users in a lobby (e.g., group lobby, personalized lobby). The recommended contests can be arranged based on their respective rank values.

The contest management system 900 can determine a rank value for a first contest 920 relative to one or more second contests 920 based in part on the contest pacing scores 925$g$ of the first contest 920 as compared to the one or more second contests 920. For example, a first rank value 925$h$ can be assigned to the first contest 920 if the first contest 920 has a different contest pacing score 925$g$ than the one or more second contests 920 and the one or more second contest 920 can be assigned a second rank value 925$h$. In some embodiments, the first contest 920 and the one or more second contests 920 can be assigned the same rank value 925$h$ if they have equal contest pacing scores 925$g$. The contest management system 900 can determine a rank value of a second contest 920 relative to one or more third contests 920 that have an open registration status.

In some embodiments, the contest management system 900 may determine a set of candidate contests 920 (e.g. all of the plurality of contests, or a smaller set of the plurality of contests that satisfy one or more predetermined conditions (such as having a rank value above a ranking threshold threshold)), and the contest management system 900 can assign rank values 925$h$ to the set of candidate contests 920 based on an average pacing values of the set of candidate contests 920. The contest management system 900 may rank the contests 920 of the set of candidate contests 920 in descending order from a highest contest pacing score 925$g$ (e.g., highest under-saturation score) to a lowest contest pacing score 925$g$ (e.g., lowest under-saturation score), or may employ any other appropriate ranking policy.

At block 1245, the contest management system 900 can provide one or more contests 920 to one or more user or user profiles 910 associated with the one or more users. The contests 920 can be provided to a device associated with the user profile 910. The contest management system 900 can provide or transmit the contests 920 to at least one device associated with each of the user profiles 910. In embodiments, the contest management system 900 can provide the contests 920 to the device through an application (e.g., client application) executing on the respective device associated with the user profile 910. The device can include any client device and/or computing device the user uses to receive data related to a contest and/or participate in a contest, such as but not limited to, client devices 102$a$-102$n$ of FIG. 1A-1B.

The contest management system 900 can use the rank values 925$h$ to determine how to arrange the plurality of contests 920 to be provided to the device associated with the cluster of users or user profiles 910, such as the layout for the contest display on a device associated with a user profile 910. The contest management system 900 can arrange the plurality of contests 920 based on rank values 925$h$. For example, the contests 920 can be arranged by rank values 925$h$ in descending order from the highest rank value 925$h$ to the lowest rank value 925$h$. In other embodiments, the contests 920 can be arranged by rank values 925$h$ in ascending order from the lowest rank value 925$h$ to the highest rank value 925$h$. In some embodiments, a contest 920 that is determined to be below pace may be displayed more prominently than would otherwise be the case.

Contests 920 can be identified for a plurality of user profiles 910 based in part on the profile attributes of the user profiles and/or contests attributes 925 of the respective contests 920. For example, each of the contests 920 can include contest attributes 925 that the contest management system 900 can extract, review and use to determine which contests 920 should be provided the plurality of users. In some embodiments, a cluster of users can be identified to be provided one or more of the plurality of contests 920 by the contest management system 900. Each user in the cluster can include a user profile 910 and each of the user profiles 910 can have similar profile attributes. For example, the cluster can group a first user profile 910 with one or more other user profiles 910 based in part on each of the user profiles 910 having multiple common profile attributes. The profile attributes can include any profile attributes described herein, for example, but not limited to, a location indicated in the user profiles, favorite teams indicated in the user profiles, favorite types of contests previously participated in.

The cluster can include a plurality of features corresponding to profile attributes, player attributes, contest attributes or a combination of two or more of them, associated with each user profile linked in the group vector. The features can be assigned a value corresponding to a frequency value that indicates the frequency that the respective feature appears in the user profiles linked by the group vector. The cluster can be used by the contest management system 900 to identify users to target with future contests 920. For example, based in part on the registration data associated with one or more contests, the contest management system can identify one or more features of a cluster of users that are common with contest attributes 925 of the one or more contests. Thus, the contest management system 900 can identify contests 920 the user linked by the cluster of users will be more likely to participate in and register for the one or more contests to aid those contests in meeting their respective registration thresholds.

It should be appreciated that although the specification and claims refer to fantasy sports, the application is not limited to fantasy sports. Rather, the scope of the application may extend to other contexts where a content management server maintains a dynamic set of resources that can be monitored for projected utilization and actions can be taken based on the projected utilization, including the generation or allocation of new resources or actions that cause traffic to be directed to one or more resources of the existing set of resources.

The invention claimed is:

1. A method comprising:
identifying, by one or more processors coupled to memory, a plurality of contests to be provided in a lobby interface to a plurality of users, the plurality of contests having a plurality of contest attributes;
determining, by the one or more processors, a respective rank value for each of the plurality of contests, the respective rank value of each contest determined using a respective registration ratio of the contest and a respective registration deadline of the contest;
updating, by the one or more processors, the respective rank value of at least one contest of the plurality of contests responsive to a change in the respective registration ratio of the at least one contest of the plurality of contests;
arranging, by the one or more processors, based on the respective rank value of the at least one contest of the plurality of contests, the plurality of contests for display within the lobby interface;
determining, by the one or more processors, that a registration limit for a first contest has been satisfied; and
allocating, by the one or more processors, computing resources for maintaining an additional contest responsive to determining that the registration limit for the first contest has been satisfied, the additional contest to include at least one contest attribute of the first contest.

2. The method of claim 1, further comprising:
identifying, by the one or more processors, the plurality of users based on one or more previous contests commonly entered by the plurality of users; and
generating, by the one or more processors, recommendations for the plurality of users based on the respective rank value of each of the plurality of contests.

3. The method of claim 1, further comprising generating, by the one or more processors, one or more contests for inclusion in the plurality of contests.

4. The method of claim 1, further comprising identifying, by the one or more processors, a subset of contests of the plurality of contests, each contest of the subset of contests having (i) a respective registration ratio that is less than a respective registration threshold, and (ii) a respective registration deadline within a predetermined time period.

5. The method of claim 4, further comprising ranking, by the one or more processors, the subset of contests based on a difference between the respective registration ratio and the respective registration threshold of each contest of the subset of contests.

6. The method of claim 5, wherein ranking the subset of contests is further based on one or more respective attributes of each contest of the subset of contests.

7. The method of claim 1, wherein updating the respective rank value of the at least one contest is further based on a time difference between a current time and the respective registration deadline of the at least one contest.

8. The method of claim 1, further comprising transmitting, by the one or more processors, to a client device, instructions to display the lobby interface on the client device.

9. The method of claim 1, wherein updating the respective rank value of the at least one contest is responsive to receiving at least one registration for the first contest of the plurality of contests.

10. The method of claim 1, further comprising:
determining, by the one or more processors, for each contest of the plurality of contests to be provided in the lobby interface, a respective allocation of computer resources to maintain the contest; and
allocating, by the one or more processors, to each contest of the plurality of contests, the respective allocation of computer resources.

11. A system comprising:
one or more processors coupled to memory, the one or more processors configured to:
identify a plurality of contests to be provided in a lobby interface to a plurality of users, the plurality of contests having a plurality of contest attributes;
determine a respective rank value for each of the plurality of contests, the respective rank value of each contest determined using a respective registration ratio of the contest and a respective registration deadline of the contest;
update the respective rank value of at least one contest of the plurality of contests responsive to a change in the respective registration ratio of the at least one contest of the plurality of contests;

arrange, based on the respective rank value of the at least one contest of the plurality of contests, the plurality of contests for display within the lobby interface;

determine that a registration limit for a first contest has been satisfied; and allocate computing resources for maintaining an additional contest responsive to determining that the registration limit for the first contest has been satisfied, the additional contest to include at least one contest attribute of the first contest.

12. The system of claim 11, wherein the one or more processors are further configured to:

identify the plurality of users based on one or more previous contests commonly entered by the plurality of users; and generate recommendations for the plurality of users based on the respective rank value of each of the plurality of contests.

13. The system of claim 11, wherein the one or more processors are further configured to generate one or more contests for inclusion in the plurality of contests.

14. The system of claim 11, wherein the one or more processors are further configured to identify a subset of contests of the plurality of contests, each contest of the subset of contests having (i) a respective registration ratio that is less than a respective registration threshold, and (ii) a respective registration deadline within a predetermined time period.

15. The system of claim 14, wherein the one or more processors are further configured to rank the subset of contests based on a difference between the respective registration ratio and the respective registration threshold of each contest of the subset of contests.

16. The system of claim 15, wherein the one or more processors are further configured to rank the subset of contests further based on one or more respective attributes of each contest of the subset of contests.

17. The system of claim 11, wherein the one or more processors are further configured to update the respective rank value of the at least one contest further based on a time difference between a current time and the respective registration deadline of the at least one contest.

18. The system of claim 11, wherein the one or more processors are further configured to transmit, to a client device, instructions to display the lobby interface on the client device.

19. The system of claim 11, wherein the one or more processors are further configured to update the respective rank value of the at least one contest responsive to receiving at least one registration for the first contest of the plurality of contests.

20. The system of claim 11, wherein the one or more processors are further configured to:

determine, for each contest of the plurality of contests to be provided in the lobby interface, a respective allocation of computer resources to maintain the contest; and allocate, to each contest of the plurality of contests, the respective allocation of computer resources.

* * * * *